US010061687B2

(12) United States Patent
Nagamalla et al.

(10) Patent No.: US 10,061,687 B2
(45) Date of Patent: Aug. 28, 2018

(54) SELF-LEARNING AND SELF-VALIDATING DECLARATIVE TESTING

(71) Applicant: PayPal, Inc., San Jose, CA (US)

(72) Inventors: Kishan Nagamalla, San Jose, CA (US); Ramesh Babu Mandava, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 443 days.

(21) Appl. No.: 14/503,313

(22) Filed: Sep. 30, 2014

(65) Prior Publication Data

US 2015/0363304 A1 Dec. 17, 2015

Related U.S. Application Data

(60) Provisional application No. 62/013,469, filed on Jun. 17, 2014.

(51) Int. Cl.
G06F 9/44 (2018.01)
G06F 11/36 (2006.01)

(52) U.S. Cl.
CPC ...... *G06F 11/3688* (2013.01); *G06F 11/3648* (2013.01); *G06F 11/3692* (2013.01)

(58) Field of Classification Search
CPC .................................................. G06F 11/3688
See application file for complete search history.

(56) References Cited

U.S. PATENT DOCUMENTS

| 2003/0088644 | A1* | 5/2003 | Ganguly | G06F 11/3414 709/218 |
| 2005/0160433 | A1* | 7/2005 | Lambert | G06F 11/3696 719/328 |
| 2008/0086474 | A1* | 4/2008 | Haycraft | G06F 21/604 |
| 2008/0313212 | A1* | 12/2008 | Yu | G06F 17/2725 |
| 2009/0063968 | A1* | 3/2009 | Wenig | G06Q 30/02 715/704 |
| 2014/0132571 | A1* | 5/2014 | Zeng | G06F 17/30 345/178 |

* cited by examiner

*Primary Examiner* — Hang Pan
(74) *Attorney, Agent, or Firm* — Maschoff Brennan

(57) ABSTRACT

A system and method for self-learning and self-validating declarative testing are provided. In example embodiments, a user experience module identifies a declarative test representing a user experience being tested. A test execution module simulates a client machine including a client machine environment and executes the declarative test using the simulated client machine and the user behavior data of the specific user to generate test results. A validation module validates the test results by invoking at least one of plurality of validators, including at least one client-side validator and at least one server-side validator.

18 Claims, 28 Drawing Sheets

953

954

SELF-LEARNING AND SELF-VALIDATING DECLARATIVE TESTING

CLAIM OF PRIORITY

This application claims the benefit of priority to U.S. Provisional Patent Application Ser. No. 62/013,469, filed on Jun. 17, 2014, which is incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2014, eBay Inc. All Rights Reserved.

TECHNICAL FIELD

Embodiments of the present disclosure relate generally to automated software testing, and more particularly, but not by way of limitation, to declarative testing.

BACKGROUND

As systems become more and more complex, and the number of ways users can interact with the system increases, there is an increasing number of user experiences that may need to be tested. It is time consuming for the system provider to create an exhaustive set of tests for testing possible user experiences for a system.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1A:
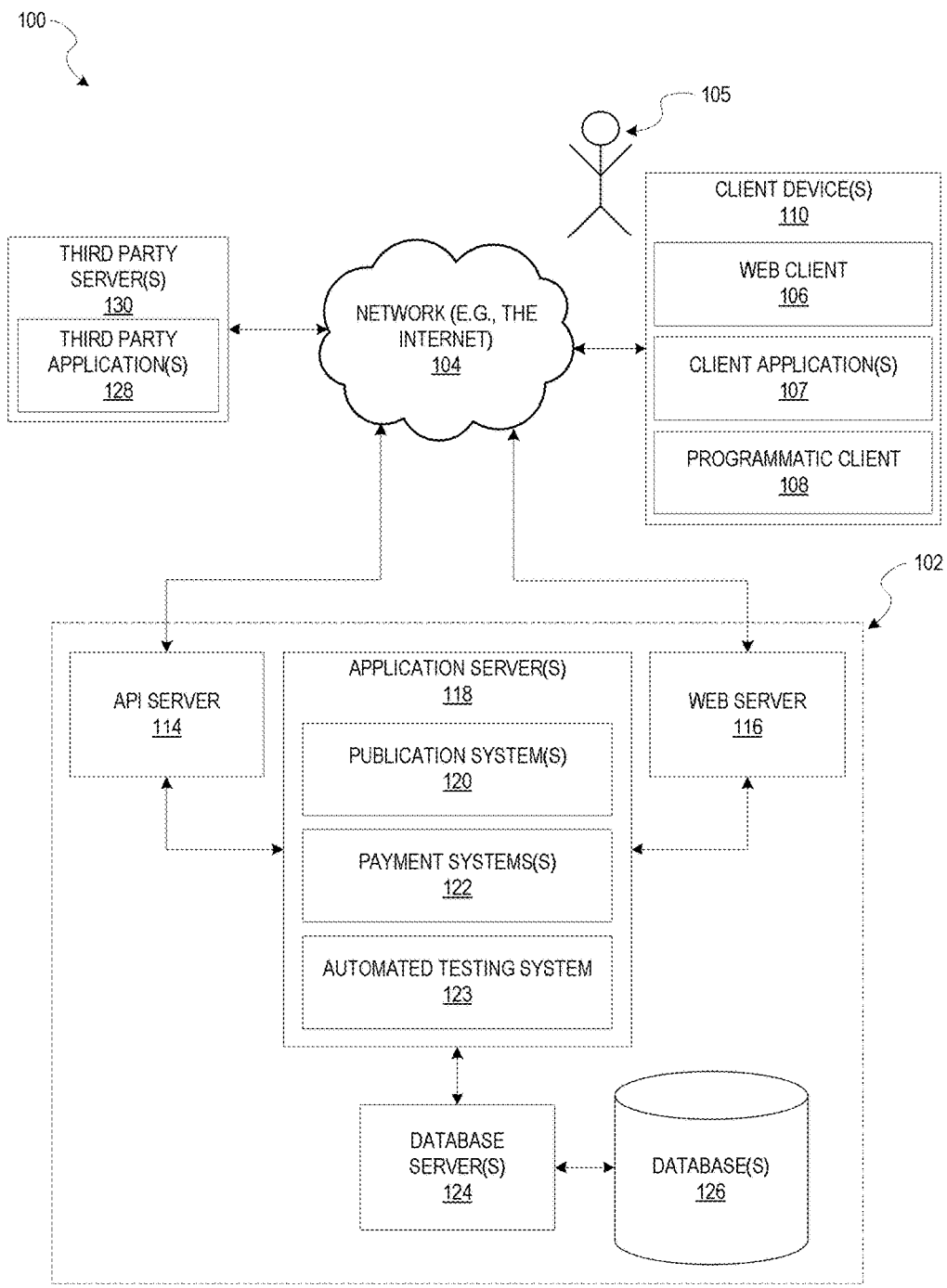
FIG. 1A is a block diagram illustrating a networked system, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Example embodiments provide systems and methods for declarative user interface (UI) automated testing. Declarative UI automated testing is the process of testing a software application or system through the application's UI by specifying a final state, referred to as the "answer". Declarative UI automated testing is used for testing various scenarios (also referred to as user experiences). The focus of declarative testing is on what to accomplish (rather than on the imperative details of how to manipulate the state of an application under test) and verify the final application, state against an expected state (also referred to as the declared answer).

Various embodiments describe declarative UI automated testing for testing web applications. The web applications may be accessed from a browser (e.g., browser on a computer or mobile device) or may be any native application running on a computer or mobile device. For an example embodiment, the code for the declaration UI automated testing in not written in a specific programming language. For example, the user interface automation may be described in the specific structure of data, such as JavaScript Object Notation (BON) or Extensible Markup Language (XML), rather than in a programming language. In various embodiments, separate test software is not required to be written for different browsers or native applications. For example, separate test software may not be required for native apps for iOS app, Android app, or Windows app. This unified approach to testing web applications may be much more efficient than creating test software for each browser and/or app.

Declarative testing in the described embodiments may be used to create or manage user experiences related to a software application or system. Declarative testing may provide significant benefits in terms of time reduction in creating and managing user experiences to validate a site's functionality. A user experience infrastructure to validate a site's user experience (e.g., a publication site or e-commerce site) may be built. In various embodiments, the user experience infrastructure is self-learning and self-validating. The user experience refers to the set of actions that a user may perform on a site. The actions may be used to trigger transitions from page-to-page; for example, starting at page 1, an action on page 1 transitions to the next page, and an action on the next page transitions to another page. The actions may be referred to as "flows" in the user experience. The following illustrates an example flow: a user opens a site (e.g., http://ebay.com) and performs the following actions: (1) clicks on My Ebay link; (2) signs in by entering user name and password; and (3) verifies My Ebay messages on My Ebay screen. Other user experiences on an e-commerce site may be built for listing, buying, searching, viewing items, providing incentives, and so forth. The flows within the user experiences may be reusable; for example HomePage, SinginPage, MyEbaySummaryPage and PurchaseHistoryPage may be reused in various user experiences for declarative testing.

In various embodiments, existing flows, user experiences or validators may be saved, and later used to create other user experiences for declarative testing. In some embodiments, the user experiences may be one page user experiences or multiple page user experiences. User experiences that transition from one page to another page based on triggering actions may be referred to as baseline user experiences. In some embodiments, the declarative tests for baseline user experiences are auto-generated. The user experiences may also be referred to as testing scenarios, or may be used to create testing scenarios.

In other embodiments, various types of validators may be created and invoked during declarative testing. The validators include client UI validators, client data validators, system error and exception validators, system data validators, or other types of validators. One or more validators may be associated with a user experience being tested. In some embodiments, multiple validators may be invoked simultaneously, and in other embodiments, multiple validators may be invoked concurrently. The validators may be created manually by entering data through a user interface, or auto-generated by a declarative testing tool. In various embodiments, the validators may be used in more than one declarative test having user experiences, flows and actions. By reusing validators previously created, creating an exhaustive set of declarative tests for testing a site becomes more automated.

In other example embodiments, declarative tests are auto-generated based on user behavior data and user identification information. The behavior data and user identification data is analyzed and then used to model page flows, which are then used to automatically create declarative tests. The declarative tests created may be saved and reused in other user experiences or testing scenarios. As the collection of declarative tests increases, the creation of new user experiences becomes more automated as the existing declarative tests are reused.

Although various example embodiments discussed below focus on a marketplace environment, the embodiments are given merely for clarity in disclosure. Thus, any type of electronic publication, electronic commerce, social networking, or electronic business system and method, including various system architectures, may employ various embodiments of the system and method described herein and may be considered as being within a scope of example embodiments. Each of a variety of example embodiments is discussed in detail below.

With reference to FIG. 1A, an example embodiment of a high-level client-server-based network architecture 100 is shown. A networked system 102 provides server-side functionality via a network 104 (e.g., the Internet or wide area network (WAN)) to a client device(s) 110. A user (e.g., user 105) may interact with the networked system 102 using the client device 110. FIG. 1A illustrates, for example, a web client 106 (e.g., a browser, such as the Internet Explorer® browser developed by Microsoft® Corporation of Redmond, Wash. State), client application(s) 107, and a programmatic client 108 executing on the client device 110. The client device 110 may include the web client 106, the client application(s) 107, and the programmatic client 108 alone, together, or in any suitable combination.

The client device 110 may comprise a computing device that includes at least a display and communication capabilities that provide access to the networked system 102 via the network 104. The client device 110 may comprise, but is not limited to, a remote device, work station, computer, general purpose computer, Internet appliance, hand-held device, wireless device, portable device, wearable computer, cellular or mobile phone, personal digital assistant (PDA), smart phone, tablet, ultrabook, netbook, laptop, desktop, multi-processor system, microprocessor-based or programmable consumer electronic, game consoles, set-top box, network PC, mini-computer, and the like. In further example embodiments, the client device 110 may comprise one or more of a touch screen, accelerometer, gyroscope, biometric sensor, camera, microphone, global positioning system (GPS) device, and the like.

The client device 110 may communicate with the network 104 via a wired or wireless connection. For example, one or more portions of the network 104 may be an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or a combination of two or more such networks.

The client device 110 may include one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, e-commerce site apps (also referred to as "marketplace apps"), and so on. The client application(s) 107 may include various components operable to present information to the user and communicate with the networked system 102. In some embodiments, if the c-commerce site application is included in the client device 110, then this application may be configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment). Conversely, if the e-commerce site application is not included in the client device 110, the client device 110 may use its web browser to access the e-commerce site (or a variant thereof) hosted on the networked system 102.

In various example embodiments, the users (e.g., the user 105) may be a person, a machine, or other means of interacting with the client device 110. In some example embodiments, the users may not be part of the network architecture 100, but may interact with the network architecture 100 via the client device 110 or another means. For instance, the users may interact with a client device 110 that may be operable to receive input information from (e.g., using touch screen input or alphanumeric input) and present information to (e.g., using graphical presentation on a device display) the users. In this instance, the users may, for example, provide input information to the client device 110 that may be communicated to the networked system 102 via the network 104. The networked system 102 may, in response to the received input information, communicate information to the client device 110 via the network 104 to be presented to the users. In this way, the user may interact with the networked system 102 using the client device 110.

An Application Program Interface (API) server 114 and a web server 116 may be coupled to, and provide programmatic and web interfaces respectively to, one or more application server(s) 118. The application server(s) 118 may host one or more publication system(s) 120, payment system(s) 122, and an automated testing system 123, each of which may comprise one or more modules or applications and each of which may be embodied as hardware, software, firmware, or any combination thereof. The application server(s) 118 are, in turn, shown to be coupled to one or more database server(s) 124 that facilitate access to one or more information storage repositories or database(s) 126. In an example embodiment, the database(s) 126 are storage devices that store information to be posted (e.g., publications or listings) to the publication system(s) 120. The database(s) 126 may also store digital goods information in accordance with some example embodiments.

Additionally, a third party application(s) 128, executing on a third party server(s) 130, is shown as having programmatic access to the networked system 102 via the programmatic interface provided by the API server 114. For example, the third party application(s) 128, utilizing information retrieved from the networked system 102, may support one or more features or functions on a website hosted by the third party. The third party website may, for example, provide one or more promotional, marketplace, or payment functions that are supported by the relevant applications of the networked system 102.

The publication system(s) 120 may provide a number of publication functions and services to the users that access the networked system 102. The payment system(s) 122 may likewise provide a number of functions to perform or facilitate payments and transactions. While the publication system(s) 120 and payment system(s) 122 are shown in FIG. 1A to both form part of the networked system 102, it will be appreciated that, in alternative embodiments, each system 122 and 124 may form part of a payment service that is separate and distinct from the networked system 102. In some example embodiments, the payment system(s) 122 may form part of the publication system(s) 120.

The automated testing system 123 may provide declarative testing functionality for a system under test. In some example embodiments, the automated testing system 123 may declaratively test one or more components from the publication system(s) 120 or payment system(s) 122. In some example embodiments, the automated testing system 123 or at least part of the automated testing system 123 may be part of the client application(s) 107. In other example embodiments, the automated testing system 123 may represent a third party application 128 residing on a third party server 130.

Further, while the client-server-based network architecture 100 shown in FIG. 1A employs a client-server architecture, the present inventive subject matter is, of course, not limited to such an architecture, and may equally well find application in a distributed, or peer-to-peer, architecture system, for example. The various systems of the applications server(s) 118 (e.g., the publication system(s) 120 and the payment system(s) 122) may also be implemented as stand-alone software programs, which do not necessarily have networking capabilities.

The web client 106 may access the various systems of the networked system 102 (e.g., the publication system(s) 120) via the web interface supported by the web server 116. Similarly, the programmatic client 108 and client application(s) 107 may access the various services and functions provided by the networked system 102 via the programmatic interface provided by the API server 114. The programmatic client 108 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 108 and the networked system 102.

Figure 1B:
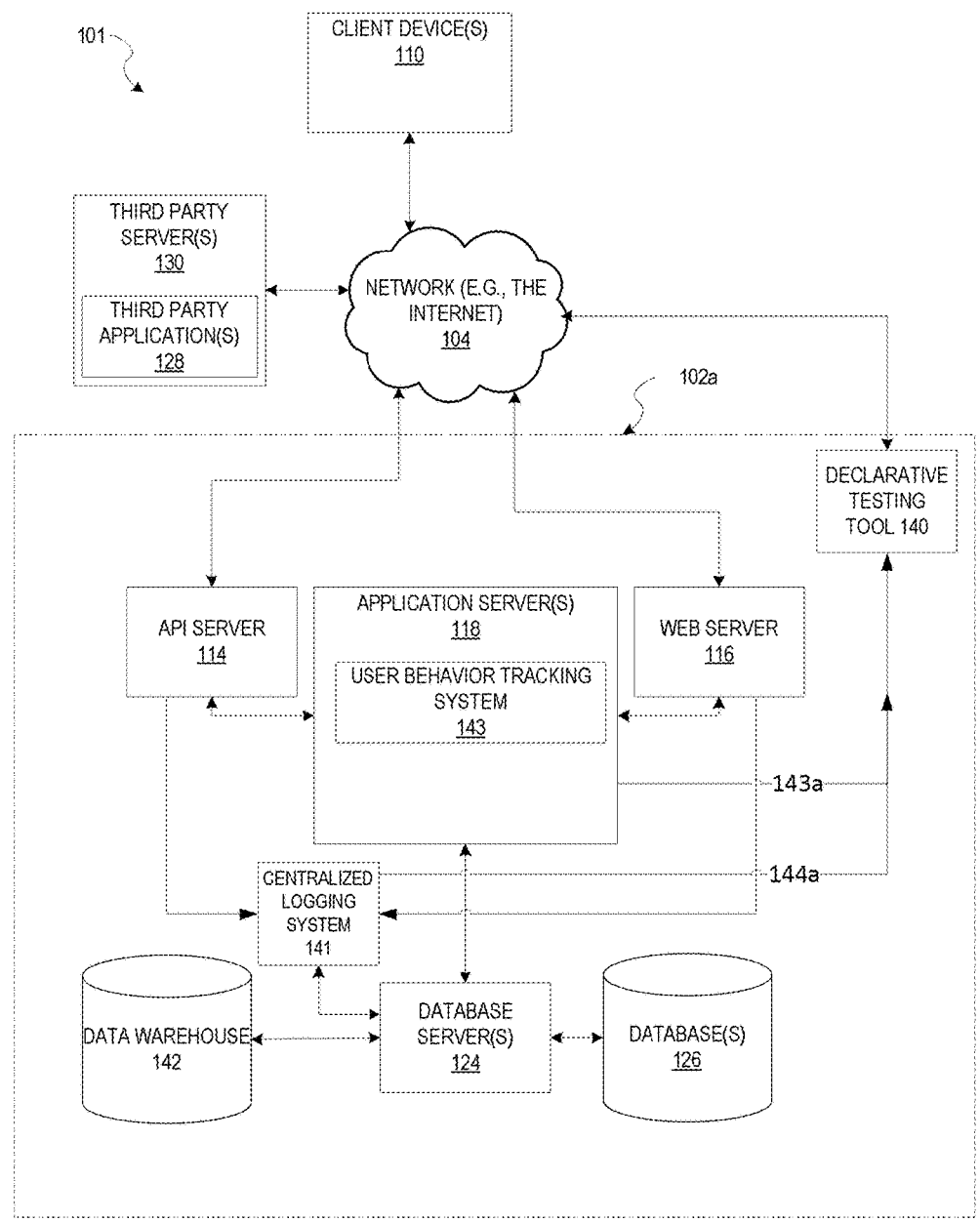
FIG. 1B is a block diagram illustrating a networked system, according to another embodiment.

FIG. 1B illustrates client-server-based network architecture 101 according to another embodiment. For example, automated testing functionality may be implemented with a user behavior tracking system 143 residing on the application server(s) 118; a centralized logging system 141, which may access the one or more database(s) 126; and a data warehouse 142, via the database server(s) 124. The user behavior tracking system 143 tracks user activity on a site. For example, the user behavior tracking system 143 may track user activity for one or more sites from the publication system(s) 120 or the payment system(s) 122 for multiple users. In various embodiments, the data warehouse 142 stores user tracking data and the database(s) 126 store persistent data. The user tracking data stores user activity on a particular site or system which is being tested. The user activity may include historical data of the activity (e.g., user clicks) of all (or a portion of the) users who have accessed that site or system. The data warehouse 142 may also be referred to as big data. The persistent data may include data associated with system or application data (e.g., publications system(s) 120, payment system(s) 122, and the automated testing system 123). The declarative testing tool 140 may receive data from the user behavior tracking system 143 over path 143a, and the data from the centralized logging system 141 over data path 144a. The user tracking data and the persistent data are used by the declarative testing tool 140 to execute declarative tests and to create declarative tests. In some embodiments, the behavior tracking system 143 or the data warehouse 142 may be located outside the networked system 102a. In further embodiments, the central logging system 141 may be located outside the networked system 102a. In additional embodiments, the declarative testing tool 140 may be located outside the networked system 102a. The declarative tests may be considered to be modular, with various reusable components, such as flows, user experiences, validators.

The user behavior tracking system 143 may track user activity using a variety of site tracking mechanisms. For example, when a user visits a site for the first time, a JavaScript may be generated and sent to the user's browser to collect the data needed. A unique cookie is generated for the user and stored on the user's computer. This standard procedure on the Internet may be used to identify a user as a unique person. When the same user returns to a site and the cookie is found, the user's clicks are recorded along with any previous visits to show the user's history clickpath through the site. In an example embodiment, the data warehouse 142 and the user behavior tracking system 143 may be partially or fully implemented, using Google Analytics, a service offered by Google, for providing a website statistics service or a similar type of service.

The centralized logging system 141 is used to track and log system errors and exceptions for a site or system, and may be included within the networked system 102 or may represent a service provided by a third party logging service provider. The centralized logging system 141 may be used to generate logs for the processes running on a system to track what the system is doing or what happens in the system. The log data (including any errors and exceptions) may be stored within the centralized logging system 141, or stored in the database(s) 126.

Figure 1C:
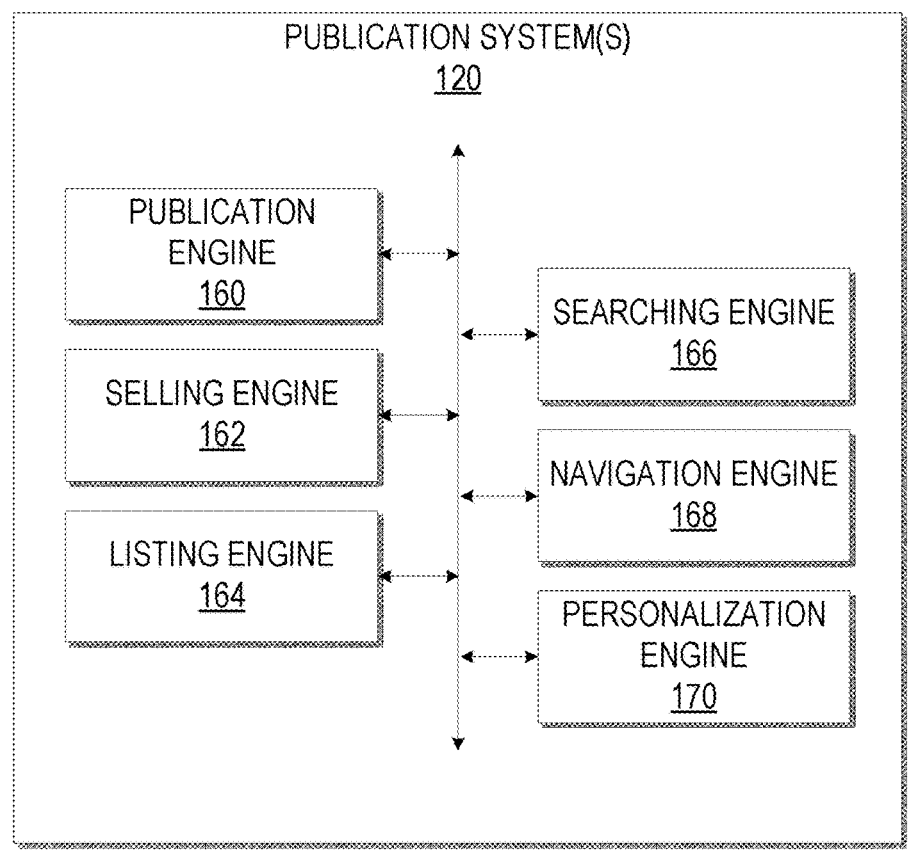
FIG. 1C illustrates a block diagram showing components provided within the system of FIGS. 1A and 1B, according to some example embodiments.

FIG. 1C illustrates a block diagram showing components provided within the publication system(s) 120, according to some embodiments. In various example embodiments, the publication system(s) 120 may comprise a marketplace system to provide market place functionality (e.g., facilitating the purchase of items associated with item listings on an e-commerce website). The networked system 102 may be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more database(s) 126 via the database server(s) 124. The system under test, in some embodiments, may include one or more systems or sites within the publication system(s) 120. During testing of the system under test, the declarative testing tool 140 may test one or more user experiences associated with one or more of the components of the publication system(s) 120 shown in FIG. 1C.

The networked system 102 may provide a number of publishing, listing, and price-setting mechanisms whereby a seller (also referred to as a "first user") may list (or publish information concerning) goods or services for sale or barter, a buyer (also referred to as a "second user") can express interest in or indicate a desire to purchase or barter such goods or services, and a transaction (such as a trade) may be completed pertaining to the goods or services. To this end, the networked system 102 may comprise a publication engine 160 and a selling engine 162. The publication engine 160 may publish information, such as item listings or product description pages, on the networked system 102. In some embodiments, the selling engine 162 may comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines may also provide a number of features in support of these auction-format listings, such as a reserve price feature whereby a seller may specify a reserve price in connection with a listing and a proxy-bidding feature whereby a bidder may invoke automated proxy bidding. The selling engine 162 may further comprise one or more deal engines that support merchant-generated offers for products and services.

A listing engine 164 allows sellers to conveniently author listings of items or authors to author publications. In one embodiment, the listings pertain to goods or services that a user (e.g., a seller) wishes to transact via the networked system 102. In some embodiments, the listings may be an offer, deal, coupon, or discount for the good or service. Each good or service is associated with a particular category. The listing engine 164 may receive listing data such as title, description, and aspect name/value pairs. Furthermore, each listing for a good or service may be assigned an item identifier. In other embodiments, a user may create a listing that is an advertisement or other form of information publication. The listing information may then be stored to one or more storage devices coupled to the networked system 102 (e.g., database(s) 126). Listings also may comprise product description pages that display a product and information (e.g., product title, specifications, and reviews) associated with the product. In some embodiments, the product description page may include an aggregation of item listings that correspond to the product described on the product description page.

The listing engine 164 also may allow buyers to conveniently author listings or requests for items desired to be purchased. In some embodiments, the listings may pertain to goods or services that a user (e.g., a buyer) wishes to transact via the networked system 102. Each good or service is associated with a particular category. The listing engine 164 may receive as much or as little listing data, such as title, description, and aspect name/value pairs, that the buyer is aware of about the requested item. In some embodiments, the listing engine 164 may parse the buyer's submitted item information and may complete incomplete portions of the listing. For example, if the buyer provides a brief description of a requested item, the listing engine 164 may parse the description, extract key terms and use those terms to make a determination of the identity of the item. Using the determined item identity, the listing engine 164 may retrieve additional item details for inclusion in the buyer item request. In some embodiments, the listing engine 164 may assign an item identifier to each listing for a good or service.

In some embodiments, the listing engine 164 allows sellers to generate offers for discounts on products or services. The listing engine 164 may receive listing data, such as the product or service being offered, a price or discount for the product or service, a time period for which the offer is valid, and so forth. In some embodiments, the listing engine 164 permits sellers to generate offers from a sellers' mobile devices. The generated offers may be uploaded to the networked system 102 for storage and tracking.

Searching the networked system 102 is facilitated by a searching engine 166. For example, the searching engine 166 enables keyword queries of listings published via the networked system 102. In example embodiments, the searching engine 166 receives the keyword queries from a device of a user and conducts a review of the storage device storing the listing information. The review will enable compilation of a result set of listings that may be sorted and returned to the client device 110 of the user. The searching engine 166 may record the query (e.g., keywords) and any subsequent user actions and behaviors (e.g., navigations, selections, or click-throughs).

The searching engine 166 also may perform a search based on a location of the user. A user may access the searching engine 166 via a mobile device and generate a search query. Using the search query and the user's location, the searching engine 166 may return relevant search results for products, services, offers, auctions, and so forth to the user. The searching engine 166 may identify relevant search results both in a list form and graphically on a map. Selection of a graphical indicator on the map may provide additional details regarding the selected search result. In some embodiments, the user may specify, as part of the search query, a radius or distance from the user's current location to limit search results.

In a further example, a navigation engine 168 allows users to navigate through various categories, catalogs, or inventory data structures according to which listings may be classified within the networked system 102. For example, the navigation engine 168 allows a user to successively navigate down a category tree comprising a hierarchy of categories (e.g., the category tree structure) until a particular set of listings is reached. Various other navigation applications within the navigation engine 168 may be provided to supplement the searching and browsing applications. The navigation engine 168 may record the various user actions (e.g., clicks) performed by the user in order to navigate down the category tree.

In some example embodiments, a personalization engine 170 may allow the users of the networked system 102 to personalize various aspects of their interactions with the networked system 102. For instance, the users may define, provide, or otherwise communicate personalization settings that the personalization engine 170 may use to determine interactions with the networked system 102. In further example embodiments, the personalization engine 170 may automatically determine personalization settings and personalize interactions based on the automatically determined settings. For example, the personalization engine 170 may determine a native language of the user and automatically present information in the native language.

Figure 2:
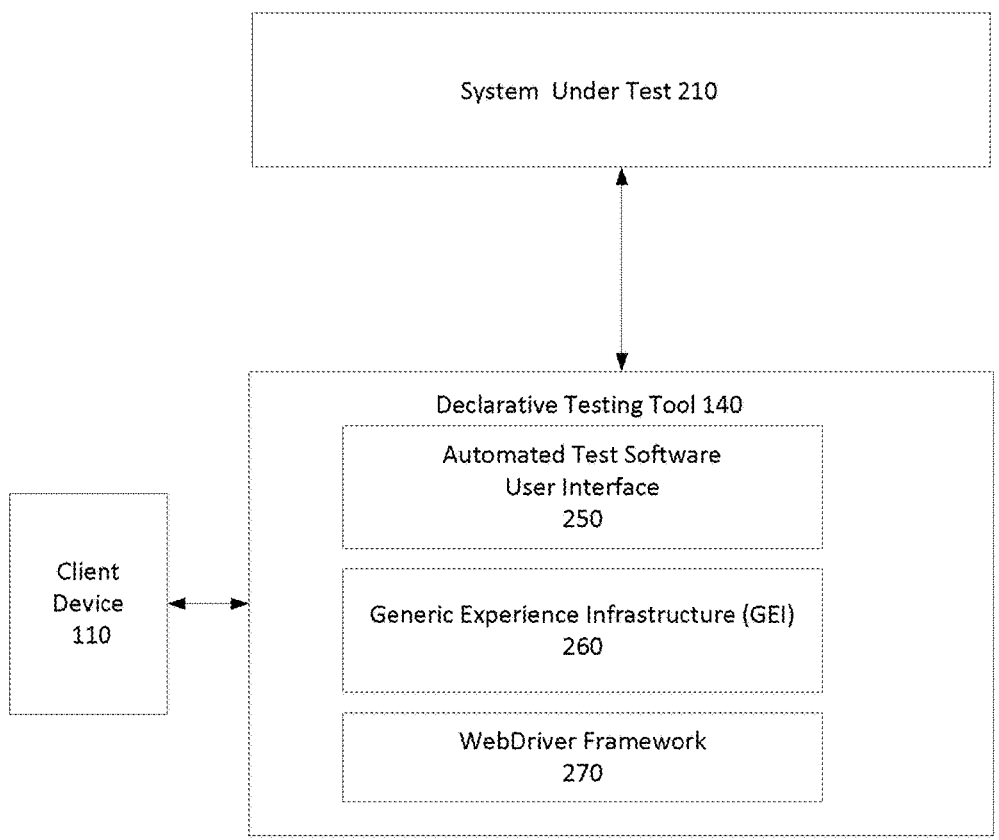
FIG. 2 is a block diagram illustrating an example embodiment of an automated testing system for a system under test.

FIG. 2 illustrates a block diagram of a system for declarative testing according to an example embodiment. In one embodiment, the system 200 and, in particular, the declarative testing tool 140 may represent the automated testing system 123 of FIG. 1 (or a portion of the automated testing system 123). In further embodiments, the declarative testing tool 140, may be located completely or partially outside the networked system 102 (shown in FIG. 1A) or the networked system 102a (shown in FIG. 1B). The declarative testing tool 140 is used to test a system under test 210. The system under test 210 may be one or more components of the publication system(s) 120 or the payment system(s) 122 shown in FIG. 1A or FIG. 1C. In an example embodiment, the declarative testing tool 140 may include an automated test software user interface 250, a generic experience infrastructure (GEI) 260, and a WebDriver framework 270.

Figure 10:
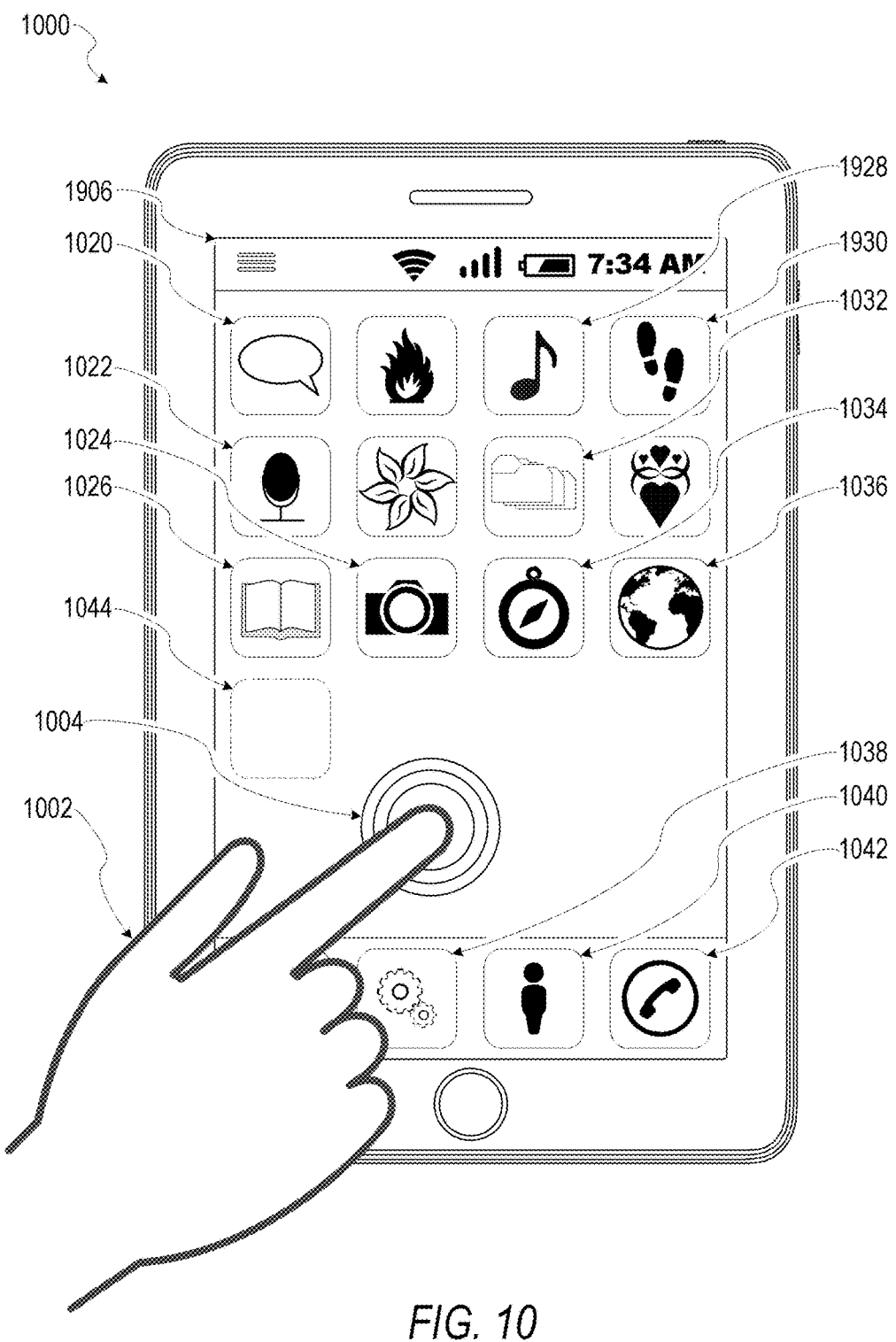
FIG. 10 depicts an example mobile device and mobile operating system interface, according to some example embodiments.

The system under test 210 may simulate a browser installed on a computing device (e.g., computing device 1210 shown in FIG. 12), a mobile browser installed on a mobile device (e.g., mobile device 1000 shown in FIG. 10), or a native application installed on a mobile device or other computing device (e.g., mobile device 1000 shown in FIG. 10). Testing the system under test 210 is done by executing a number of user experiences and validating the test results. The user experiences or testing scenarios may represent a single page user experience or a multiple page user experience in various embodiments. Examples of JSON single page and multiple page user experiences are provided below. Testing the system under test 210 may be performed prior to a production release of the system under test 210, or may be performed while the system under test 210 is deployed in production. Exhaustive or extensive testing of the system under test 210 may be performed by creating various user experiences or testing scenarios. The various user experiences may be created automatically by the declarative testing tool 140. For some embodiments, the testing may be initiated by a customer or user who has identified an error or failure in the system under test 210. Such testing may re-create one or more user experiences directed at the failure.

Automated declarative testing of the system under test 210 may be performed in combination with manual testing or other forms of automated testing. The user experiences may not call for separate tests to be written for different web browsers or native apps installed on devices (e.g., computing devices and mobile devices). If testing is performed when the system under test 210 is deployed in production, a customer or user (e.g., user 105 shown in FIG. 1) may call the site customer service to report a bug or error with the site UI. For example, the user 105 may detect a bug or error while accessing a software application hosted on application server(s) 11.8 through a client device 110. By using the declarative testing tool 140 to test the system under test 210 (e.g., a software application residing on application server(s) 118, the declarative testing tool 140 may be able to re-create the user experience to identify the error reported. Re-creating the user experience to identify reported errors may improve the customer experience when there is a failure/bug. In various embodiments, the user experience is tracked by the user behavior tracking system 143 shown in FIG. 1B.

In some embodiments, the declarative testing tool 140 describes user interface automation for testing using a specific structure of data, for example JSON/XML, rather than in a programming language. JSON may be referred to as a lightweight data-interchange format that is easy for humans to read and write. JSON is a text format that is completely language independent. The declarative testing tool 140 may read data and interpret the data. Automation in this form does not require specific compilation to create user experiences. Furthermore, a software developer or user creating automated user experiences or testing scenarios need not know any specific programming language. The software developer or user may be able to write user interface automation for testing using one unified syntax without writing code. The declarative testing tool 140 may drastically reduce the amount of time to write and maintain the automation of the system under test 210, as compared to other approaches which require a programming language (i.e., Java, C#, Ruby Python and Javascript) and to be compiled and run to verify the automation.

A WebDriver refers to a tool for automating web application testing, and in particular to verify that they work as expected. Selenium includes a suite of different software tools to support test automation. Selenium is an open-source software, released under the Apache 2.0 license. One example of a WebDriver is a Selenium-WebDriver, which provides a friendly API that helps to make tests easier to read and maintain. The Selenium-WebDriver may integrate the WebDriver API with Selenium 2.0 and may be used to better support dynamic web pages where elements of a page may change without the page itself being reloaded. One of Selenium's key features is the support for executing tests on multiple browser platforms. The Selenium-WebDriver may support the following browsers: Google Chrome; Internet Explorer 6, 7, 8, 9, 10-32 and 64-bit where applicable; Firefox: latest ESR, previous ESR, current release, one previous release; Safari; Opera; HtmlUnit; phantomjs; Android (with Selendroid or appium); iOS (with ios-driver or appium).

The generic experience infrastructure (GEI) 260 abstracts automation testing specific to a target device/browser. In an example embodiment, the GEI 260 may be built on top of a WebDriver framework 270. The WebDriver framework 270 may provide different driver implementations compatible with different browsers/devices. The GEI 260 may leverage the WebDriver framework 270 or some other framework depending on the capabilities needed by the declarative testing tool 140. In various embodiments, the GEI 260 provides abstract programming framework specifics, and exposes declarative language, which may be in a JSON or XML format or other formats that are easy for users to read or write.

In one example, a WebDriver framework 270 may be one framework used to test a UI with the tests written in a programming language like Java or C#. In this example, the GEI 260 may consume input in a readable format like JSON, and convert the JSON format into Java programming WebDriver-understandable instructions. In other embodiments, the JSON format may be converted into other programming languages. The GEI 260 may interpret the input and decide what underlying implementation may be used for the target UI (e.g., Desktop Browser/Mobile Browser/Smartphone Apps).

In an example embodiment, the WebDriver framework 270 may be a Selenium-WebDriver. The WebDriver framework 270 may provide a friendly API to help make tests easier to read and maintain without being tied to any particular test framework.

In an example embodiment, the GEI 260 provides declarative test specifications to write experience definitions in the JSON format. The GEI 260 allows developers to write declarative test specifications that describe the input behavior of a software module representing a user experience or test scenario. The GEI 260 provides a GEI-runner library to run validate and execute JSON experiences. The GEI 260 also provides a unified way of building experiences for desktop browsers and mobile browsers, in addition to iOS, Android and Windows smart devices. In various embodiments, the user experiences created and executed in the GEI 260 may contribute to the automated test software user interface 250 to enable monitoring of the user experiences and flows of the system under test 210.

The automated test software user interface 250 includes a test monitoring infrastructure (not shown). The automated test software user interface 250 may be used to monitor user experiences on a site. The automated test software user interface 250 may leverage the GEI 260 to automate user experiences by performing quicker tests and with less maintenance cost. For an example embodiment, the automated test software user interface 250 may be a layer on top the underlying automation framework, and may include application/business policies such as retry, call specific components, send additional monitoring signals, etc. For an example embodiment, the test monitoring infrastructure may abstract automatic retry when a user experience execution failed.

For various embodiments, the GEI 260 may include one or more of the following features or functions. The framework may categorize the error when a user experience fails and propagate appropriate exception to denote infrastructure test or a software under test issue; enable various users to build automation of user experiences to easily test; provide maven archetype to create test projects including all the dependencies like WebDriver, test ng, and the like; provide HTML reporter to generate steps HTML report; and provide Jenkins job configuration to easily create and schedule jobs.

Figure 3A:
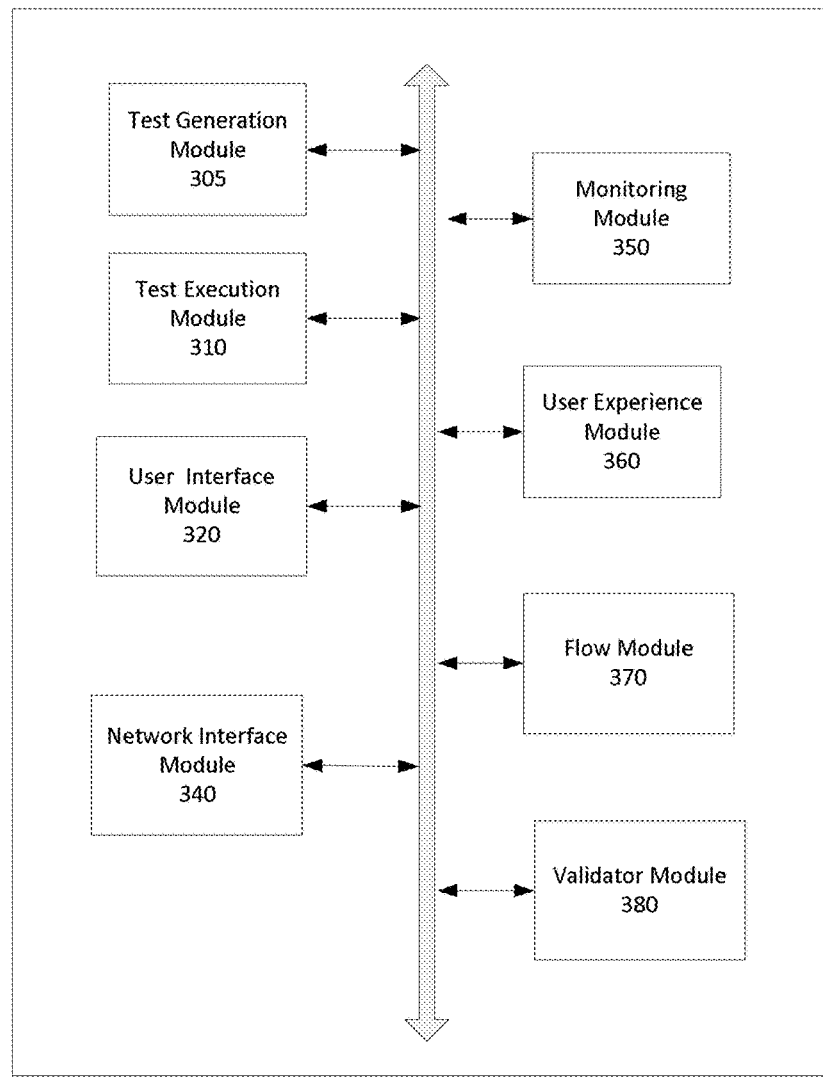
FIG. 3A is a block diagram illustrating an example embodiment of a generic experience infrastructure.

FIG. 3A is a block diagram illustrating an example embodiment of a GEI. In an example embodiment, a GEI 300 comprises a test generation module 305, a test execution module 310, user interface module 320, network interface module 340, monitoring module 350, user experience module 360, flow module 370, and validator module 380. The GEI 300 may represent the GEI 260 or the GEI 260 in combination with the automated test software user interface 250 or the WebDriver framework 270. All of the modules may communicate with each other, for example, via a network coupling, shared memory, and the like. It will be appreciated that each module may be implemented as a single module, combined into other modules, or further subdivided into multiple modules. Other modules not pertinent to example embodiments may also be included, but are not shown. In alternative embodiments, one or more modules shown in the GEE 300 may not be used. In other embodiments, one or more modules shown in the GEI 300 may be implemented in the automated test software user interface 250 and the WebDriver framework 270 shown in FIG. 2. For example, one or more of the user interface module 320, network interface module 340 and the monitoring module 350 may be implemented in the automated test software user interface 250.

Figure 5:
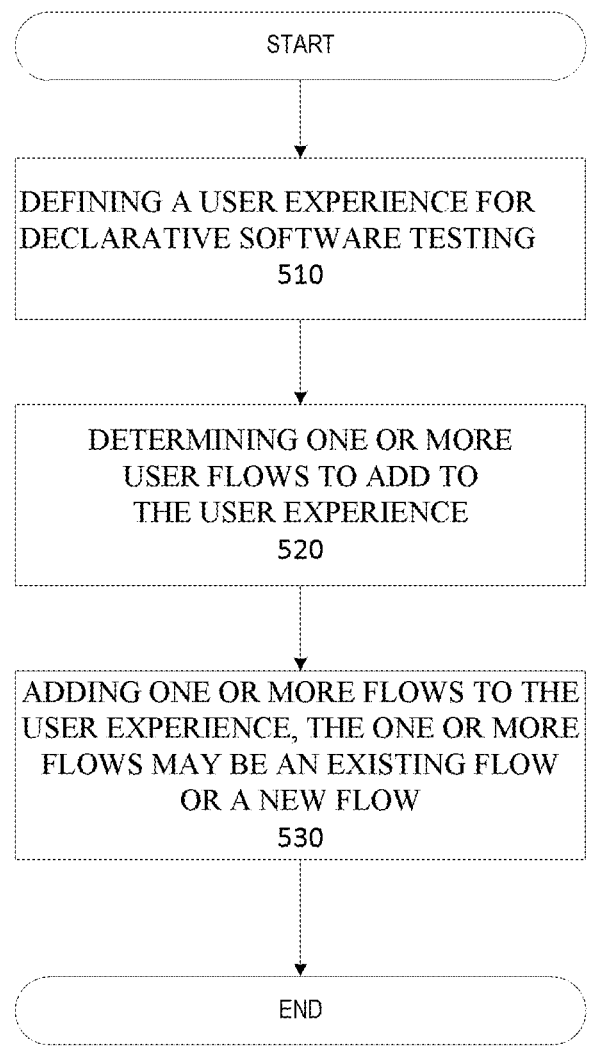
FIG. 5 is a flow diagram illustrating a method of creating a user experience for automated declarative testing of a system under test, according to an example embodiment.

In an example embodiment, the user experience module 360 is configured to create or define new user experiences using one or more flows from the flow module 370. An example flow diagram of creating a user experience related to a system under test is shown in FIG. 5. In further embodiments, the user experience module 360 is configured to access user experiences (e.g., existing user experiences including flows) from a data store (e.g., database(s) 126 shown in FIG. 1), or the data warehouse 142. The user experiences may be created or defined with exiting flows or new flows. The flow module 370 is configured to create or define flows (also referred to as steps or actions). An example of defining a new flow for a multiple page user experience is described below with FIGS. 9A-9O. In various embodiments, the user experience module 360 and the flow module 370 provide functionality to manually create flows and user experiences with the flows by a user, such as a test user. In other embodiments, the test generation module 305, alone or in combination with the user experience module 360 and the flow module 370, provides functionality to dynamically, or automatically, create declarative tests for user experiences. In some embodiments, the test generation module 305 automatically creates declarative tests using behavior data (e.g., user tracking data) as well as other types of data (e.g., error or exception data and application data of the system under test).

Figure 6:
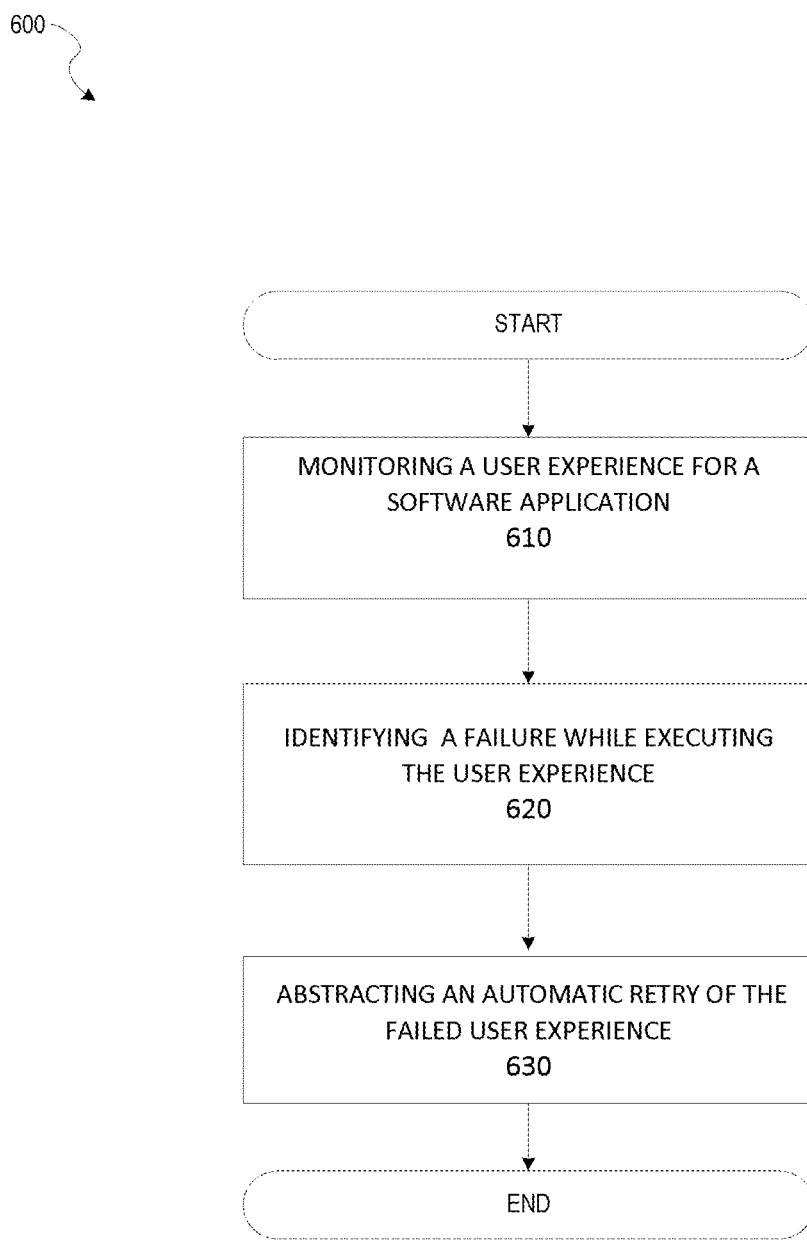
FIG. 6 is a flow diagram illustrating a method of monitoring software applications to identify errors for automated declarative testing of a system under test, according to an example embodiment.
Figure 7:
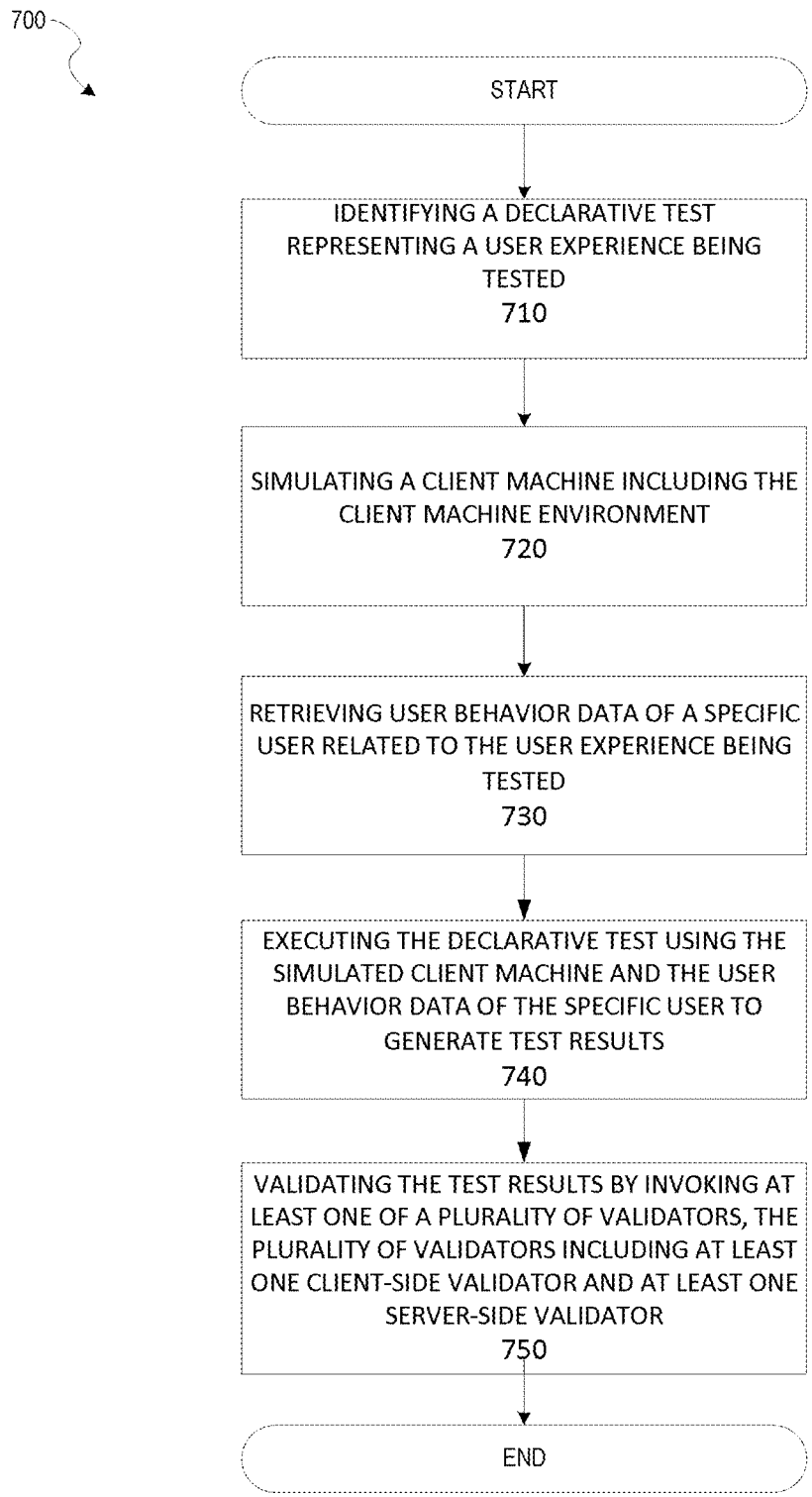
FIG. 7 is a flow diagram illustrating a method of execution and validation of declarative tests, according to an example embodiment.

In an example embodiment, the test execution module 310 is configured to execute one or more user experiences while testing the system under test 210. The test execution module 310 may be configured to employ the declaratively defined testing scenarios or user experiences to test the UI or data of the system under test 210. Examples of flow diagrams of automated declarative testing are shown in FIG. 6 and FIG. 7. The declarative tests executed by the test execution module 310 may be generated by the test generation module 305, alone, or in combination with the flow module 370, the user experience module 360, the validator module 380, or other modules shown in FIG. 3A. In various embodiments, the declarative tests executed by the test execution module 310 include validation of the data (including client UI, client data, system error/exception data, and systems data). Testing may be performed by the test execution module 310 prior to deployment of a software application into production (e.g., during testing and pre-production releases) or while the software application is deployed in production. In further embodiments, during testing, the test execution module 310 may be configured to validate or verify that the user experience is correct or provides the declared answer.

The validator module 380 may verify that a testing scenario or user experience is operating correctly by comparing the actual product state (e.g., the results from the test execution module 310) with the declared answer. In various embodiments, the validator module 380, together with the test execution module 310, determines when to invoke one or more validators. There are various types of validators to test data on the client side or the system (or server) side. Also, there are validators to test the UI of a client. There are validators that are specific for a certain type of user, such as a buyer, seller, or other user of the system. The validators may be tied to a specific page in a user experience. For example, there are validators that test the home page of a system (e.g., an e-commerce site). The validators may be created automatically or manually for various user experiences. The validators may be saved and re-used. When a declarative test is generated, one or more validators can be associated with the user experiences being declaratively tested. One or more validators may be invoked concurrently or simultaneously.

In various embodiments, a monitoring module 350 may be configured to monitor the user experiences and flows of a software application (e.g., the system under test 210). An example flow diagram of monitoring a software application is shown in FIG. 6.

Figure 9A:
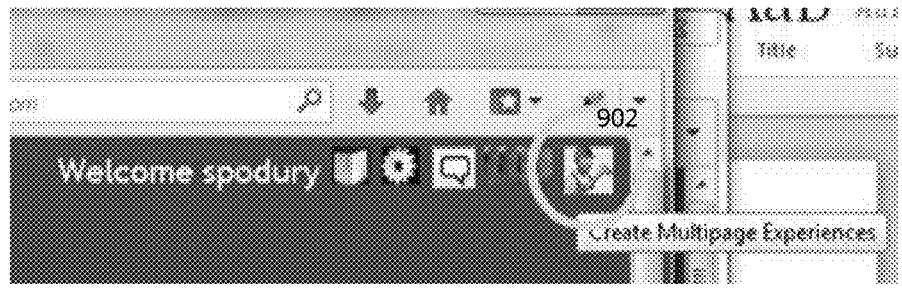
FIGS. 9A-9O illustrate user interfaces for creating a multiple page user experience, according to an example embodiment.
Figure 9B:
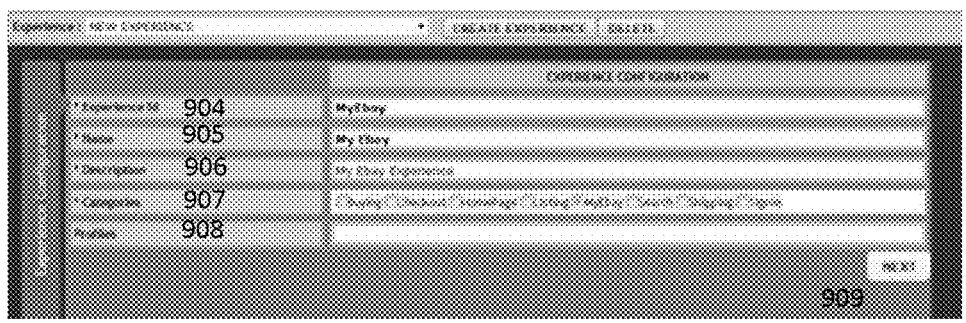
Figure 9C:
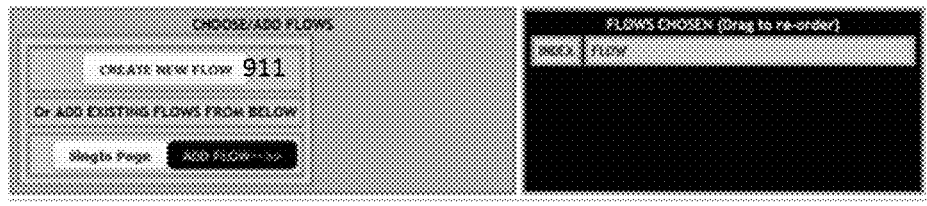

In various embodiments, the user interface module 320 is configured to view and configure the various screens related to the user experiences or testing scenarios. FIGS. 9A-9O illustrate various screens displayed to user. The user interface module 320 may be configured to receive input from a user for entering data into the various screens displayed to the user (e.g., screens shown in FIGS. 9A-9O) in example embodiments. Input received from a user may be provided by one or more of the input devices described in FIG. 12 (for example, I/O components 1250). In further embodiments the user interface module 320 is configured to receive input and to display information to execute the automated declarative testing, create user experiences and flows, and monitor software applications. In other example embodiments the user interface module 320 is configured to receive declarative definitions of user experiences or testing scenarios (for example, what the end result should be for each user experience). For example, the declared answer for a declaratively defined user experience may be received by the user interface module 320. In further embodiments, the user interface module 320 may be used to display the results of the tests performed by the test execution module 310 for the various user experiences, which were defined and/or created by the user experience module 360.

The network interface module 340 is configured to provide network access to the GEI 300 for performing automated declarative testing of the system under test. In some embodiments, the system under test 210 is connected to the declarative testing tool through a network (e.g., network 104).

The test generation module 305 provides functionality to self-generate declarative tests in various embodiments. The test generation module 305 provides functionality for the system (e.g., declarative testing tool 140) to self-learn and to create the declarative tests in some embodiments. When a declarative test for a user experience is generated by the test generation module 305, the declarative information (e.g., answer or expected result or declared results) for the test will be generated. The test generation module 305, alone or in combination with the validator module 380, may automatically create validators or manually add validators to the declarative test by the test user.

In example embodiments, validators, such as baseline validators, are automatically created by the test generation module 305. The baseline validators may test the transitions from one page to another page for a user experience. The user actions trigger the transitions from page to page. The declarative testing tool 140 is an intelligent system and understands the system under test 210. For example, the declarative testing tool 140, including the test generation module 305, knows that when a user is on a home page, the declarative testing tool 140 can perform multiple actions, and when a user is on the sign-in page, it can perform a single action. Based on the pages and the actions associated with the various pages, the test generation module 305 determines which validators should be assigned to a declarative test for a particular user experience. As more and more validators are generated, or manually added to the declarative testing tool 140, the collection of validators increases. This collection of validators can be reused for multiple declarative tests to test many user experiences.

The test generation module 305 retrieves or identifies the user type and the user identification (collectively referred to as the "user identification information"). The user type may indicate whether a user is a buyer, seller, developer, or other type of user who may access or have user privileges to use the system under test 210. The user identification is needed to retrieve the historical user behavior of that particular user.

The test generation module 305 retrieves or accesses user behavior data from the user behavior tracking system 143 for that particular user. For various embodiments, the declarative tests are being generated for the particular user to test the user experience. Once the declarative tests associated with particular user experiences have been generated, those tests may be saved in the declarative testing tool 140, or other testing framework, and re-used when testing the same or similar user experience associated with another user.

The test generation module 305 analyzes the historical user tracking data. The user type, user actions and page transitions are analyzed to simulate the user's experience that is being tested. The test generation module 305 simulates the user's experience by modeling the page flows, with the user actions triggering the transitions between the pages. In various embodiments, the test generation module 305 generates the declarative tests automatically.

In further embodiments, the test generation module 305 analyzes the user experience of the particular user by using additional data, such as test data or sample data representing similar or other users. The test data or sample data may be fetched from by the test generation module 305 from the user behavior tracking system 143 or data warehouse 142, or from the automated testing system 123.

In example embodiments, the test generation module 305 provides functionality to automate the creation of test validators. Many publication systems are so vast, and used by an extremely large number of users in many different ways, that more validators are needed for testing the publication systems (e.g., system under test 210) to ensure the system is working properly. Some validators may be referred to as "basic validators" or "transition validators" (i.e., transitioning between multiple pages based on user actions). These basic or transition validators may be generated automatically by the test generation module 305 in various embodiments.

The test generation module 305 may provide self-learning functionality. Over time, the declarative testing tool 140 learns the system under test 210 in a manner similar to artificial intelligence. Different validators can be built, generated or created over time. More and more validators can be built automatically by the declarative testing tool 140 based on data accessible to the declarative testing tool 140. Data from the user behavior tracking system 143 (and the data stored in the data warehouse 142, data from the centralized logging system 141, and other data stored in the databases 126 (e.g., persistent data), or data from the system under test 210, are accessible to the test generation module 305 in various embodiments. The test generation module 305 has access to the system under test 210 data, understands how the system under test 210 should perform, and What data should be captured by the system under test 210. This information enables the test generation module 305 to generate more and more validators over time; thereby its learning increases. Additionally, test users may be provided with the ability to add more validators manually, in particular, if they need a validator immediately for testing a specific user experience.

Figure 3B:
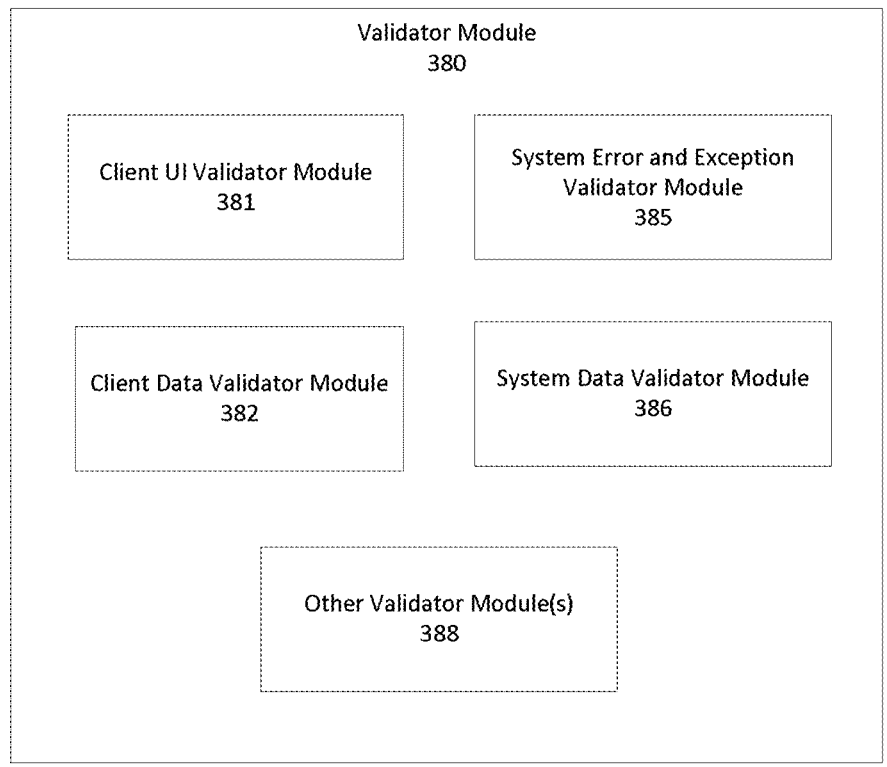
FIG. 3B is a block diagram illustrating an example embodiment of a validator module.

FIG. 3B illustrates an example of the validator module 380. According to the embodiment shown in FIG. 3B, the validator module 380 includes a client UI validator module 381, a client data validator module 382, a system error and exception validator module 385, a system data validator module 386, and other validator module(s) 388. Each of these validator modules 381, 382, 385, 386, 388 may include one or more validators, generated automatically by the test generation module 305 (shown in FIG. 3A) or manually added by a test user to create a test for the desired user experience.

In some embodiments, many of the validator modules 381388 represent types of information validated on various systems or client devices (e.g., client device 110). In various example embodiments, the client UI validator module 381 includes one or more validators used to validate a client UI associated with the client device of a particular user, and the client data validator module 382 includes one or more validators used to validate data associated with the client device of a particular user. The client UI and client data of the client device may be associated with a particular user in which the declarative test is testing the user experience of that particular user. The particular user may be represented by the user 105 associated with the client device 110.

In addition to validating data and the UI on the client side, data on the system side can also be validated in various embodiments. For example embodiments, the system under test 210 may include one or more systems from the publication system(s) 120. In other example embodiments, the user experiences being tested may be associated with (or used to test user experiences generated by) the listing engine 164, searching engine 166, the navigation engine 168, or the personalization engine 170. The system error and exception validator module 385 includes one or more validators used to validate system errors and exceptions, which may be logged by the centralized logging system 141 shown in FIG. 1B. The system data validator module 386 includes one or more validators used to validate system errors. The system data validated by the system data validator module 386 may be accessed from the database(s) 126 or the data warehouse 142 associated with the system under test 210. In other example embodiments, other validator module(s) 388 may include one or more validators. The other validators represent validators not included within validator modules 381, 382, 385 and 386. One or more validators from validator modules 381, 382, 385, 386, and 388 may be invoked concurrently or sequentially during the test validation of user experiences. Furthermore, once a validator is created, it may be reused during test validation.

A system, comprising at least one processor configured to perform operations for processor-implemented modules, includes a user experience module 360, a test execution module 310, and a validator module 380. A user experience module 360 is configured to identify a declarative test representing a user experience being tested. A test execution module 310 is configured to simulate a client machine including the client machine environment; retrieve user behavior data of a specific user related to the user experience being tested; execute the declarative test using the simulated client machine and the user behavior data of the specific user to generate test results. A validator module 380 is configured to validate test results by invoking at least one of a plurality of validators, the plurality of validators including at least one client-side validator and at least one server-side validator.

In various embodiments, the test execution module 310 is configured to simulate the client machine including the client machine environment by simulating one or more of operating systems, browser applications, native applications or other software applications running on the client machine during a user experience corresponding to the user experience being tested. In further embodiments, the declarative test representing the user experience being tested may be executed in many different client machine environments simulated.

In some embodiments, the test execution module 310 is configured to retrieve the user behavior data by identifying the user behavior data by logging in with user credentials of the specific user, and accessing the user behavior data related to the user experience being tested. In other embodiments, the test execution module 310 is configured to retrieve the user behavior data by retrieving the user behavior data of the specific user from the user behavior tracking system 143 of FIG. 1B, the user behavior tracking system 143 tracking user actions related to a site of the system under test 210. In one embodiment, test execution module 310 is configured to retrieve the user behavior data of the specific user from the user behavior tracking system 143 by accessing, by the user behavior tracking system 143, the user behavior data of the specific user stored in the data warehouse 142.

In various embodiments, the test execution module 310 is configured to execute the declarative test using the simulated client machine and the user behavior data of the specific user to generate test results by executing the declarative test using the simulated client machine and the user behavior data of a test user to generate additional test results.

In various example embodiments, the validator module 380 is configured to validate the test results by invoking the at least one of the plurality of validators by invoking the at least one client-side validator, the at least one client-side validator including a UI validator to validate UI presented. In some example embodiments, the validator module 380 is configured to validate the test results by invoking the at least one of the plurality of validators by invoking the at least one client-side validator, the at least one client-side validator including a system validator to validate client data.

In other example embodiments, the validator module 380 is configured to validate the test results by invoking the at least one of the plurality of validators by invoking the at least one server-side validator, the at least one server-side validator including a system error and exception validator module 385 to validate system errors and exceptions. In one example embodiment, the validator module 380 is configured to invoke the at least one server-side validator by providing input to the at least one of the plurality of validators invoked, the input including at least: a request simulated by a test system, a response received from the system under test 210, test metadata, and error and exception tracking data logged by the centralized logging system 141 (FIG. 1B).

In further embodiments, the validator module 380 is configured to validate the test results by invoking the at least one of the plurality of validators by invoking the at least one server-side validator, the at least one server-side validator including a system data validator module 386 to validate system data. In one embodiment, the validator module 380 is configured to invoke the at least one server-side validator by providing input to the at least one of the plurality of validators invoked, the input including at least, a request simulated by a test system, a response received from the system under test 210, test metadata, and additional data, the additional data including at least one or more of application data from the system under test 210 or user behavior data of a user.

In other embodiments, the validator module 380 is configured to validate the test results by invoking the at least one of the plurality of validators by invoking the plurality of validators sequentially. In some embodiments, the validator module 380 is configured to validate the test results by invoking the at least one of the plurality of validators further comprising by invoking the plurality of validators concurrently. In other embodiments, the validator module 380 is configured to validate the test results by invoking the at least one of the plurality of validators by generating a new validator; and invoking the new validator. In yet another embodiment, the validator module 380 is configured to validate the test results by invoking the at least one of the plurality of validators by providing input to the at least one of the plurality of validators invoked, the input including at least: a request simulated by a test system, a response received from the system under test 210, and test metadata.

Figure 3C:
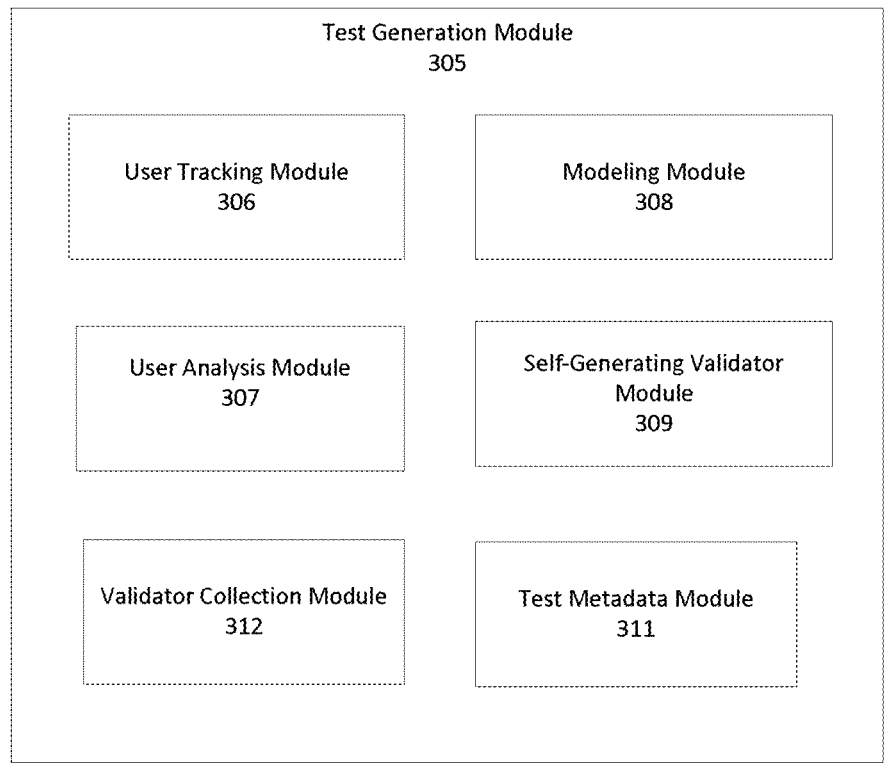
FIG. 3C is a block diagram illustrating an example embodiment of a test generation module.

FIG. 3C illustrates an example test generation module 305. In an example embodiment, the test generation module 305 includes a user tracking module 306, a user analysis module 307, a modeling module 308, a self-generating validator module 309, a validator collection module 312 and a test metadata module 311. The user tracking module 306 may be used to retrieve the user identification information, and to retrieve or access user behavior data from the user behavior tracking system 143 (shown in FIG. 1B) for that particular user. The user analysis module 307 may be used to analyze the historical user tracking data based on the user type, user actions and page transitions. The modeling module 308 may be used to simulate the user experience of a particular user. The self-generating validator module 309 may be used to generate a variety of validators based on self-learning. The validator collection module 312 provides functionality to re-use already created validators.

The test metadata module 311 provides functionality to generate, retrieve or provide the test metadata for the test validators (e.g., validators from the validator modules 381, 382, 385, 386 or 388). The test metadata may be included within the declarative test itself (e.g., within a JSON file), or may be retrieved from another location (or other persistent sources), for a particular page. For some embodiments, if the test metadata is not included within the declarative test itself, it may be retrieved dynamically. The test metadata may represent a declarative answer or an adaptive answer, according to various embodiments. The test metadata may be maintained in tables. An example table for mapping test metadata may include a page ID and associated tags.

Figure 3D:
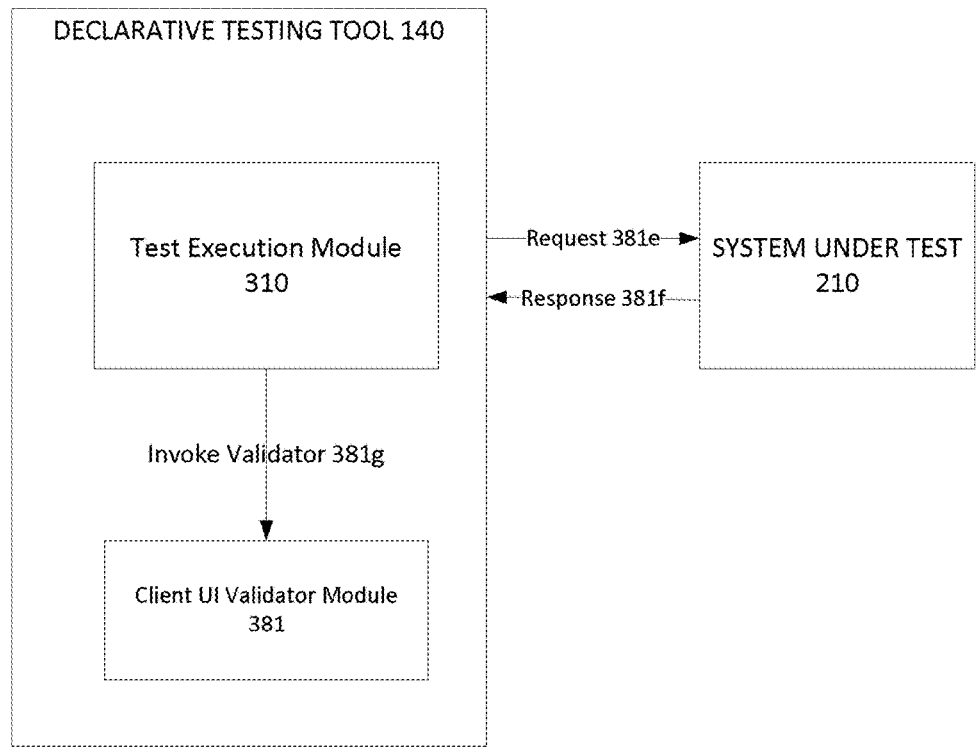
FIG. 3D illustrates a declarative testing tool invoking a client user interface (UI) validator module for testing a system, according to one embodiment.

FIG. 3D illustrates the declarative testing tool 140 invoking the client UI validator module 381 while testing the system under test 210, according to an example embodiment. The client UI validator module 381 confirms or validates the UI of the client device. For example, what is displayed on the UI is what is expected to be displayed on the UI during a user experience. The declarative testing tool 140 is simulating a user experience on a client device for a particular user. The declarative testing tool 140 sends a request 381e to the system under test 210 and waits for a response 381l from the system under test 210. The response 381l may be referred to as the actual response. Once the test execution module 310 executes the test by sending one or more requests 381e and receives one or more responses 381f, the test execution module 310 may invoke (at reference number 381g) the client UI validator module 381.

Figure 3E:
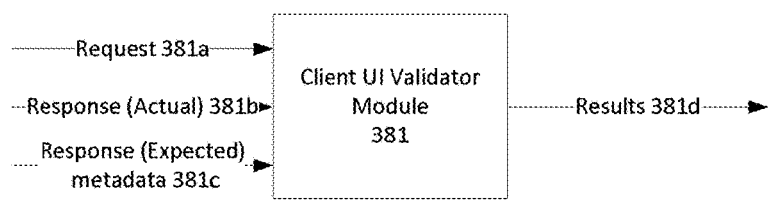
FIG. 3E illustrates a client UI validator module having various inputs and outputs, according to an example embodiment.

FIG. 3E illustrates the inputs received by the client UI validator module 381 and output provided by the client UI validator module 381 according to an example embodiment. Once the client UI validator module 381 is invoked, it receives multiple inputs (381a-381e), and produces results 381d specifying either a pass or fail, according to an example embodiment. The input received by the client UI validator module 381 includes a request 381a from the test execution module 310. The request 381a may be the same as the request 381e sent to the system under test 210. The actual response 381b and the expected response metadata 381c are also received by the client UI validator module 381. The actual response 381b may be the same as the response 381f received from the system under test 210. The client UI validator module 381 compares the actual response 381b with the expected response metadata 381c. A pass or fail result is determined based, at least in part, on the comparison of the actual response 381b and the expected response metadata 381e. The expected response metadata 381c may also be referred to as test metadata. In various embodiments, the test metadata may be generated by the test metadata module 311 shown in FIG. 3C. Based on the request 381a, response 381b and results 381d, the client UI validator module 381 generates a pass or fail result in an example embodiment. The various UI components shown on pages associated with a user experience being tested declaratively are validated by the client UI validator module 381.

Figure 3F:
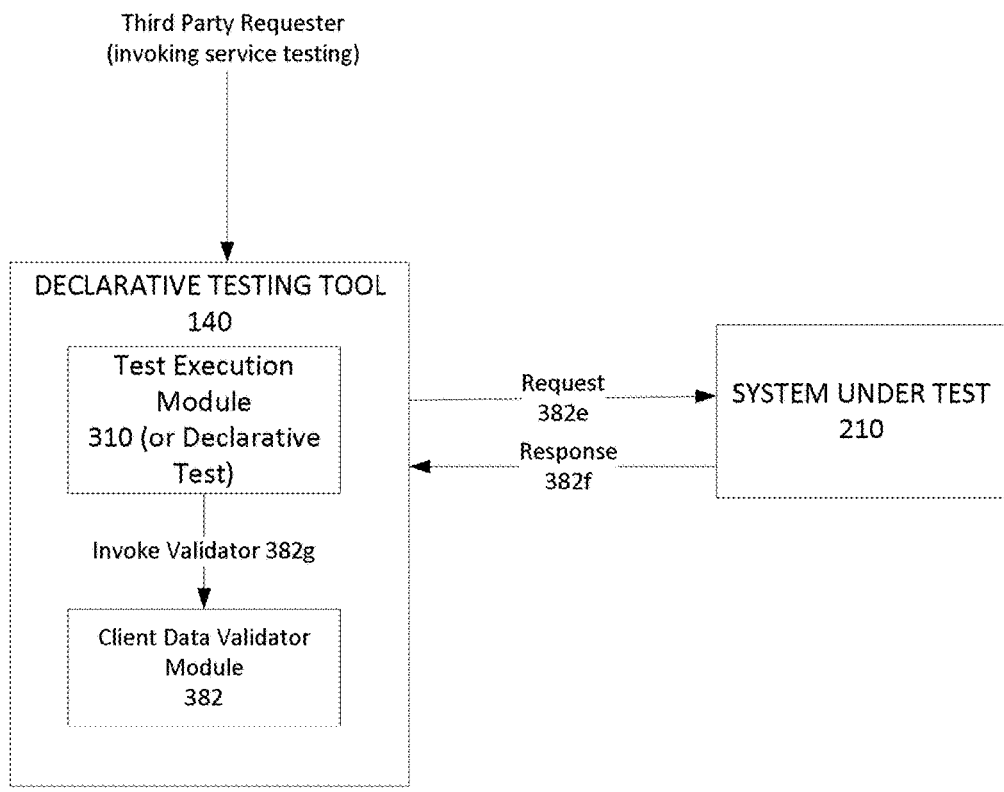
FIG. 3F illustrates a declarative testing tool invoking a client data validator module for testing a system, according to another embodiment.

FIG. 3F illustrates the declarative testing tool 140 invoking the client data validator module 382 while testing the system under test 210, according to an example embodiment. The client data validator module 382 confirms or validates the data of the client device. The declarative testing tool 140 is simulating a user experience on client device for a particular user. The declarative testing tool 140 sends a request 382e to the system under test 210 and waits for a response 382f from the system under test 210. The response 382f may be referred to as the actual response. Once the test execution module 310 executes the test by sending one or more requests 382e and receives one or more responses 382f, the test execution module 310 may invoke the client data validator module 382.

For example, a user who is a third party developer would like to integrate the user's profile service with a system, such as the publication system 120. The third party developer user does not use the system's UI. Instead, the third party developer user uses an API/service to retrieve the client data from the system under test 210 without any UI component. The system under test 210 may directly request a service.

Figure 3G:
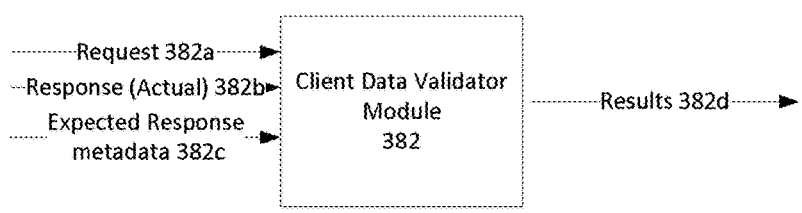
FIG. 3G illustrates a client data validator module having various inputs and outputs, according to an example embodiment.

FIG. 3G illustrates the inputs received by the client data validator module 382 and output provided by the client data validator module 382 according to an example embodiment. Once the client data validator module 382 is invoked, it receives multiple inputs (382a-382c), and produces results 382d specifying either a pass or fail, according to an example embodiment. The input received by the client data validator module 382 includes a request 382a from the test execution module 310. The request 382a may be the same as the request 382e sent to the system under test 210. The actual response 382b and the expected response metadata 382c are also received by the client data validator module 382. The actual response 382b may be the same as the response 382f received from the system under test 210. The client data validator module 382 compares the actual response 382b with the expected response metadata 382c. A pass or fail result is determined, at least in part, based on the comparison of the actual response 382b and the expected response metadata 382e. The expected response metadata 382c may also be referred to as test metadata. In various embodiments, the test metadata may be generated by the test metadata module 311 shown in FIG. 3C. Based on the request 382a, response 382b and response metadata 382c, the client data validator module generates a pass or fail result 382d in an example embodiment. The various data components shown on pages associated with a user experience being tested declaratively are validated by the client data validator module 382.

Figure 3H:
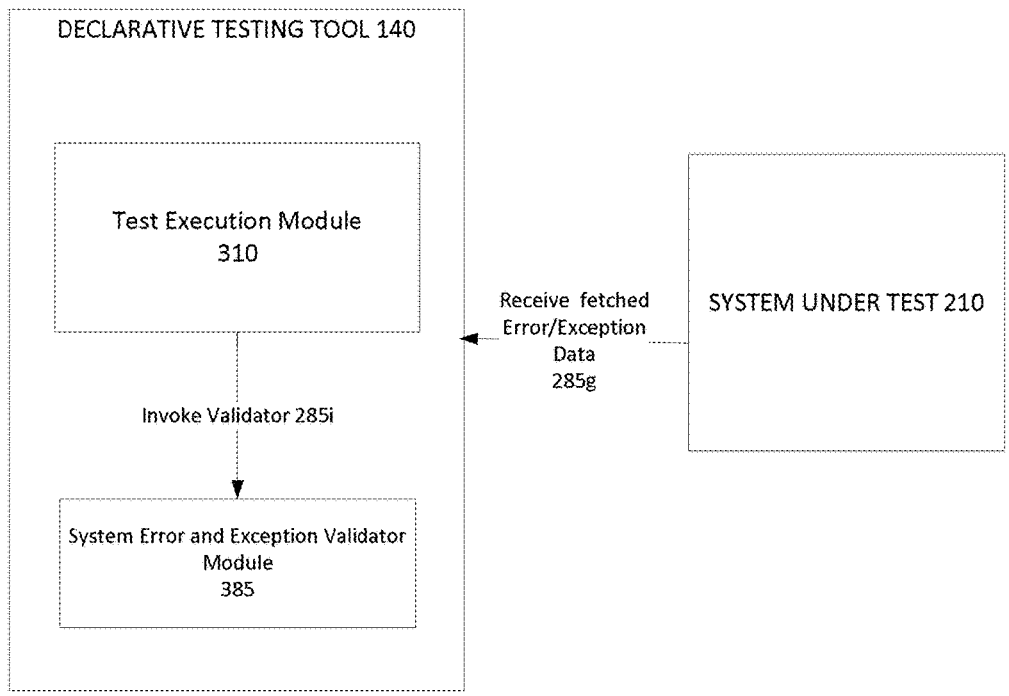
FIG. 3H illustrates a declarative testing tool invoking a system or and exception validator module for testing a system, according to a further embodiment.

FIG. 3H illustrates the declarative testing tool 140 invoking the system error and exception validator module 385 while testing the system under test 210, according to an example embodiment. The system errors and exception validator module 385 confirms or validates the system errors/exceptions. The system errors/exceptions are logged by the centralized logging system 141 in some embodiments. The declarative testing tool 140 is simulating a user experience on the system side. The declarative testing tool 140 fetches error/exception data (shown by 285g) from the system under test 210. The error/exception data fetched is associated with a particular user in some embodiments. The fetched error/exception data received may be referred to as the actual response. Once the test execution module 310 executes the test and fetches the error/exception data, the test execution module 310 may invoke the system error and exception validator module 385.

Figure 3I:
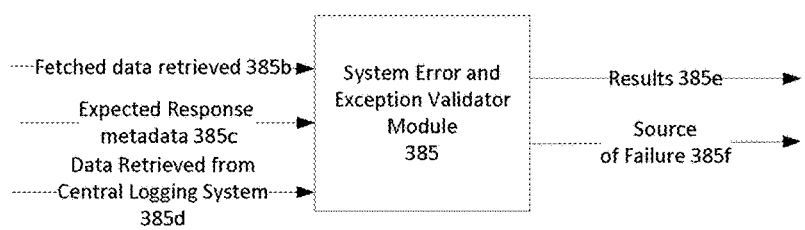
FIG. 3I illustrates a system error and exception validator module having various inputs and outputs, according to an example embodiment.

FIG. 3I illustrates the inputs received by the system error and exception validator module 385 and output provided by the system error and exception validator module 385 according to an example embodiment. Once the system error and exception validator module 385 is invoked, it receives multiple inputs 385b-3885d, and produces results 385e specifying either a pass or fail and specifying one or more sources of a failure 385f (if result 385e indicates a fail), according to an example embodiment. The input received by the system error and exception validator module 385 includes fetched data retrieved 385b from the test execution module 310. The fetched data retrieved 385b may be the same as the receive fetched error/exception data (285g) received from the system under test 210, and may represent an actual response. The system error and exception validator module 385 compares the fetched data retrieved 385b with the expected response metadata 385c. A pass or fail result 385e is determined, at least in part, based on this comparison. The expected response metadata 385c may also be referred to as test metadata. The system error and exception validator module 385 also receives data 385d retrieved from a central logging system (e.g., centralized logging system 141). The data 385d retrieved from the centralized logging system may be associated with a particular user whose user experience is being tested declaratively. In various embodiments, the test metadata may be generated by the test metadata module 311 shown in FIG. 3C. Based on the data retrieved 385b, response metadata 385c and data 385d, the system error and exception validator module 385 generates a pass or fail result on output 385e and the source of the failure on output 385f in an example embodiment.

Figure 3J:
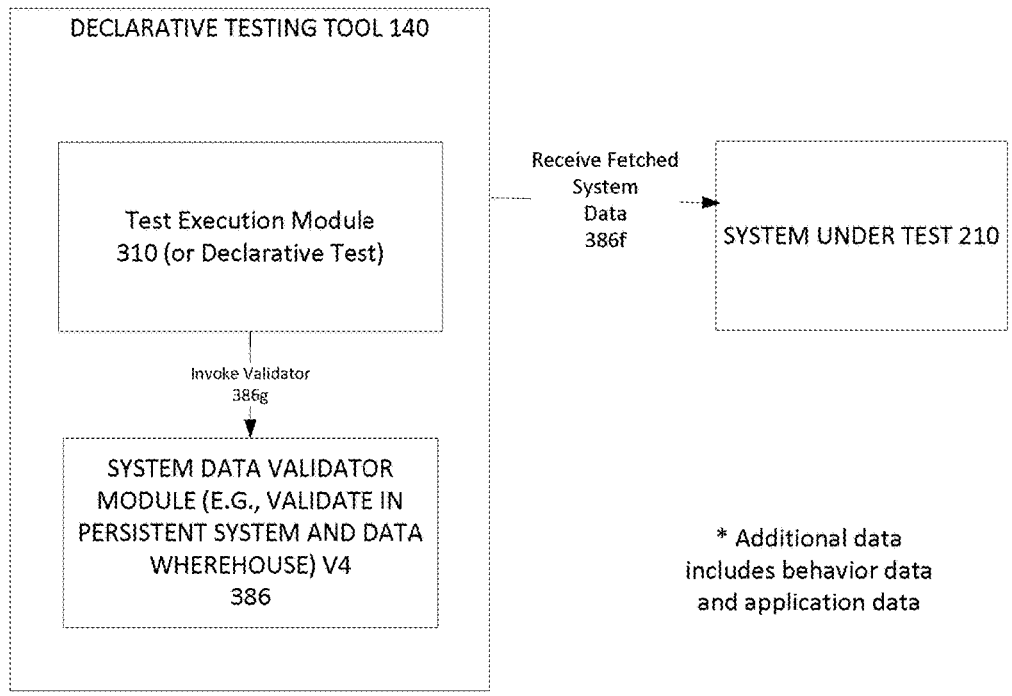
FIG. 3J illustrates a declarative testing tool invoking a system validator module for testing a system, according to an example embodiment.

FIG. 3J illustrates the declarative testing tool 140 invoking the system data validator module 386 while testing the system under test 210, according to an example embodiment. The system data validator module 386 confirms or validates the system data. The declarative testing tool 140 is simulating a user experience on the system side. The declarative testing tool 140 fetches system data (shown by 386f) from the system under test 210. The system data fetched may validate system data such as the user tracking or behavior data from the data warehouse (e.g., data warehouse 142) and the data from the system under test 210 (e.g., the application data stored in persistent data stores such as database(s) 126). The system data fetched is associated with a particular user in some embodiments. The system data received may be referred to as the actual response. Once the test execution module 310 executes the test and receives the fetched system data, the test execution module 310 may invoke (over path 386g) the system data validator module 386.

Figure 3K:
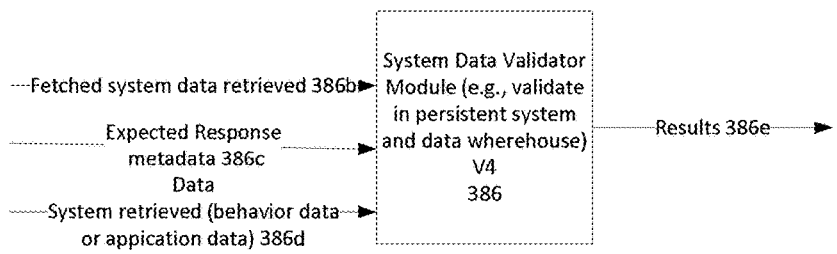
FIG. 3K illustrates a system data validation module having various inputs and outputs, according to an example embodiment.

FIG. 3K illustrates the inputs received by the system data validator module 386 and output provided by the system data validator module 386 according to an example embodiment.

Once the system data validator module 386 is invoked, it receives multiple inputs (386b-386d), and produces results 386e specifying either a pass or fail, according to an example embodiment. The input received by system data validator module 386 includes fetched system data retrieved 386b from the test execution module 310. The fetched system data retrieved 386b may be the same as the fetched system data received (285g) from the system under test 210, and may represent an actual response. The system data validator module 386 compares the fetched system data retrieved 386b with the expected response metadata 386c. A pass or fail result 386e is determined, at least in part, based on this comparison. The expected response metadata 386c may also be referred to as test metadata. The system data validator module 386 also receives the system data retrieved 386d from a data warehouse 142 or persistent storage. The system data retrieved 386b may be associated with a particular user whose user experience is being tested declaratively. In various embodiments, the test metadata may be generated by the test metadata module 311 shown in FIG. 3C. Based on the data retrieved 386b, response metadata 386c and data retrieved 386d, the system data validator module 386 generates a pass or fail result 386e in an example embodiment.

Figure 4:
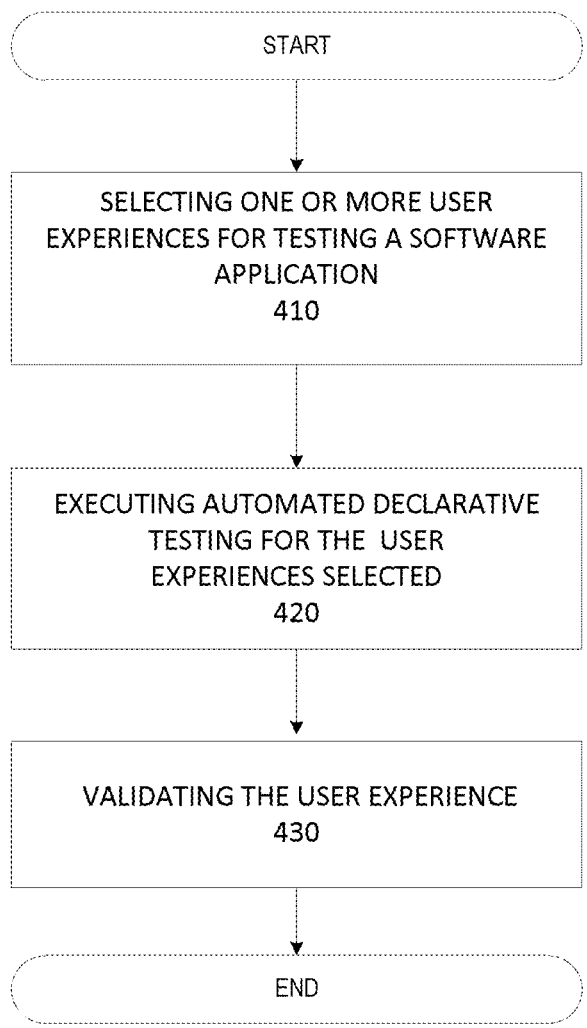
FIG. 4 is a flow diagram illustrating automated declarative testing of a system under test, according to an example embodiment.

FIG. 4 is a flow diagram illustrating automated declarative testing of a system under test, according to an example embodiment. In one embodiment, the method 400 comprises: at operation 410, selecting one or more user experiences for testing a software application; at operation 420, executing automated declarative testing for the user experiences selected; and at operation 430, validating the user experience. The method 400 may be implemented using one or more components of the declarative testing tool 140 (shown in FIG. 4) or by one or more modules of the generic experience infrastructure 260 (shown in FIG. 2). In alternative embodiments, additional operations may be added to the method 400 or one or more operations may be deleted from the method 400. In further embodiments, the operation of methods 400, 500 and 600, or variants of these methods, may be combined.

FIG. 5 is a flow diagram illustrating the creation of a user experience for automated declarative testing of a data in a software application, according to an example embodiment. In one embodiment, the method 500 comprises: at operation 510, defining a user experience for declarative software testing; at operation 520, determining one or more user flows to add to the user experience; and at operation 530, adding one or more flows to the user experience, where the one or more flows may be an existing flow or a new flow. The method 500 may be implemented using one or more components of the declarative testing tool 140 (shown in FIG. 4) or by one or more modules of the GEI 260 (shown in FIG. 2). In alternative embodiments, additional operations may be added to the method 500 or one or more operations may be deleted from the method 500.

FIG. 6 is a flow diagram illustrating the monitoring of software applications to identify errors for automated declarative testing of a data in a software application, according to an example embodiment. In one embodiment, the method 600 comprises: at operation 610, monitoring a user experience for a software application; at operation 620, identifying a failure while executing the user experience; and at operation 630, abstracting an automatic retry of the failed user experience. The method 600 may be implemented using one or more components of the declarative testing tool 140 (shown in FIG. 4) or by one or more modules of the GEI 260 (shown in FIG. 2). In alternative embodiments, additional operations may be added to the method 600 or one or more operations may be deleted from the method 600.

FIG. 7 is a flow diagram illustrating a method of executing and validating of user experiences on a system using declarative tests. A method 700 for declarative testing is described by operations 710-750 according to various example embodiments. At operation. 710, a declarative test representing a user experience being tested is identified. At operation 720, a client machine including the client machine environment is simulated. At operation 730, retrieving user behavior data of a specific user related to the user experience being tested is retrieved. At operation 740, the declarative test using the simulated client machine and the user behavior data of the specific user to generate test results is executed. At operation 750, the test results are validated by invoking at least one of a plurality of validators, where the plurality of validators include at least one client-side validator and at least one server-side validator.

In an example embodiment, the method 700 comprises the operation 720 of simulating the client machine, including the client machine environment, by simulating one or more of operating systems, browser applications, native applications or other software applications running on the client machine during a user experience corresponding to the user experience being tested. In another example embodiment of method 700, the declarative test representing the user experience being tested may be executed in many different simulated client machine environments.

In a further embodiment, the method 700 comprises the operation 730 of retrieving the user behavior data by identifying the user behavior data by logging in with user credentials of the specific user; and accessing the user behavior data related to the user experience being tested. In yet another embodiment, the method 700 comprises the operation 730 of retrieving the user behavior data by retrieving the user behavior data of the specific user from a user behavior tracking system, the user tracking system tracking user actions related, to a site of the system under test (e.g., system under test 210). In some embodiments, the operation 730 of retrieving the user behavior data of the specific user from the user behavior tracking system includes accessing, by the user behavior tracking system, the user behavior data of the specific user stored in a data warehouse.

In an example embodiment, the method 700 comprises the operation 740 executing the declarative test using the simulated client machine and the user behavior data of the specific user to generate test results by executing the declarative test using the simulated client machine and the user behavior data of a test user to generate additional test results.

In one example embodiment, the method 700 comprises at operation 750 validating the test results by invoking the at least one of the plurality of validators by the at least one client-side validator, the at least one client-side validator including a UI validator to validate UI data presented. In another example embodiment, the method 700 comprises at operation 750 validating the test results by invoking the at least one of the plurality of validators by invoking the at least one client-side validator, the at least one client-side validator including a system validator to validate client data.

In other example embodiments, the method 700 comprises at operation 750 validating the test results by invoking the at least one of the plurality of validators by invoking the at least one server-side validator, the at least one server-side validator including a system error and exception validator to validate system errors and exceptions in one example embodiment, the operation of invoking the at least one server-side validator includes providing input to the at least one of the plurality of validators invoked, the input including, at least: a request simulated by a test system, a response received from the system under test, test metadata, and error and exception tracking data logged by a centralized logging system (e.g., centralized logging system 141). In other example embodiments, the method 700 comprises at operation 750 validating the test results by invoking the at least one of the plurality of validators by invoking the at least one server-side validator, the at least one server-side validator including a system data validator to validate system data. In one example embodiment, the operation of invoking the at least one server-side validator includes providing input to the at least one of the plurality of validators invoked, the input including, at least: a request simulated by a test system, a response received from the system under test, test metadata, and additional data, the additional data including at least one or more of application data from the system under test or user behavior data of a user.

In other example embodiments, the method 700 comprises at operation 750 validating the test results by invoking the at least one of the plurality of validators by invoking the plurality of validators sequentially. In another example embodiment, the method 700 comprises at operation 750 validating the test results by invoking the at least one of the plurality of validators by invoking the plurality of validators concurrently. In further embodiments, the method 700 comprises at operation 750 validating the test results by invoking the at least one of the plurality of validators by generating a new validator; and invoking the new validator. In yet another embodiment, the method 700 comprises at operation 750 validating the test results by invoking the at least one of the plurality of validators further by providing input to the at least one of the plurality of validators invoked, the input including, at least: a request simulated by a test system, a response received from the system under test, and test metadata.

Figure 8A:
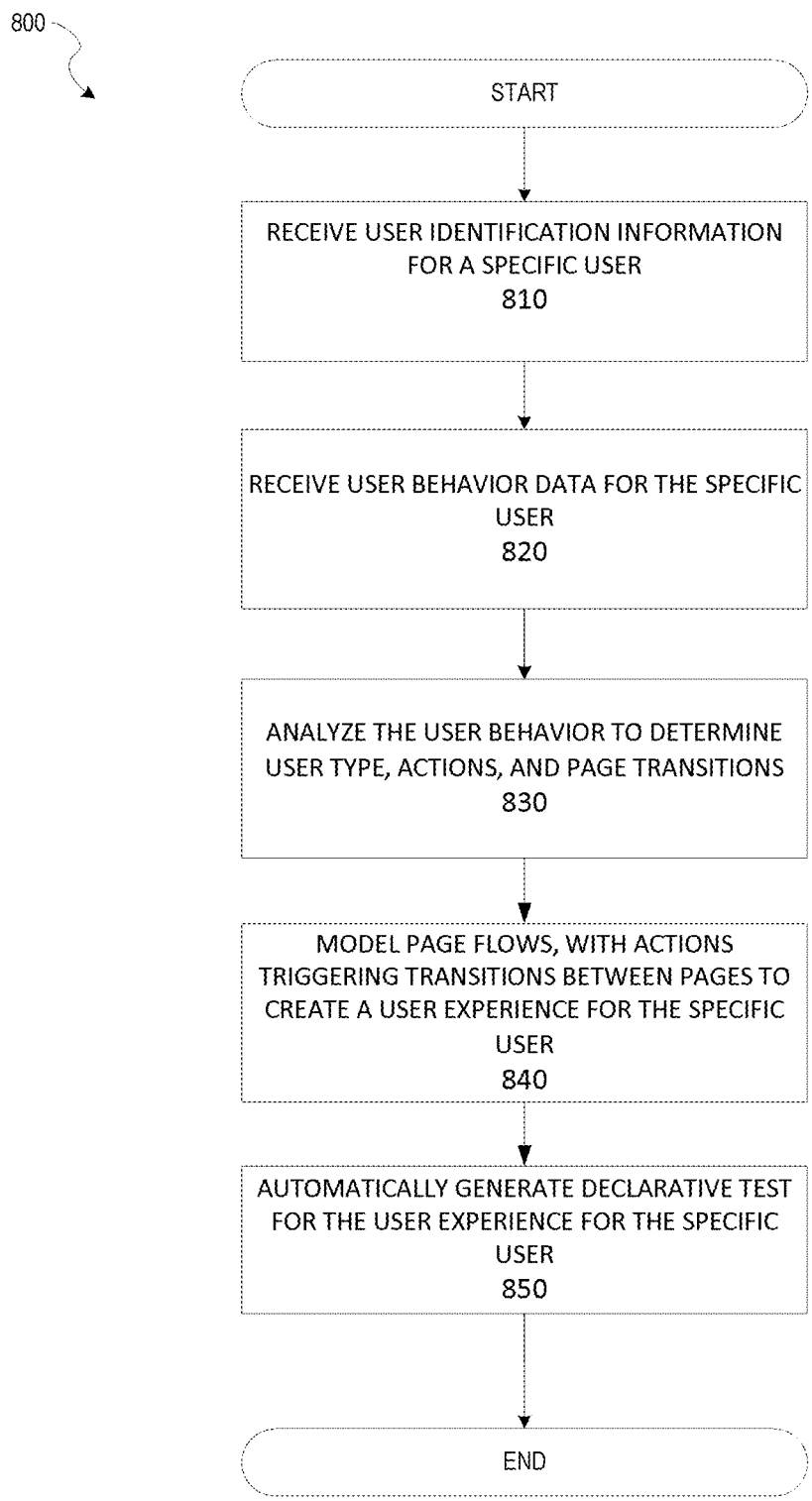
FIG. 8A is a flow diagram illustrating a method of self-generating declarative tests, according to an example embodiment.

FIG. 8A is a flow diagram illustrating a method of automatically generating declarative tests. A method 800 for automatically generating declarative tests is described by operations 810-850 according to various example embodiments. The method 800 may be implemented using one or more modules of the declarative testing tool 140, the GEI 300, the validator module 380, or the test generation module 305.

At operation 810, user identification information for a specific user is received. At operation 820, user behavior data for a specific user is received. In an example embodiment, the declarative test tool 140 receives the user identification information and the user behavior data. For one example, the user behavior data is provided from the user behavior tracking system 143 (shown in FIG. 1B). In some embodiments, the user identification information may be provided by the user behavior tracking system 143 (shown in FIG. 1B) or from another system such as the publications system(s) 120 or the payment system(s) 122 (shown in FIG. 1A). At operation 830, the user behavior is analyzed to determine the user type, actions and page transitions. At operation 840, the page flows are modeled with actions triggering transitions between pages to create a user experience for the specific user. At operation 850, a declarative test for the user experience for the specific user is automatically generated. In some embodiments, the automatically generated declarative test for the user experience may include automatically generated validators or manually generated validators. For example, client UI validators, client data validators, system error and exception validators, system data validators, or other validators may be generated using the validator module 380 (shown in FIG. 3B), alone or in combination one or modules included within the test generation module 305, for example the self-generating validator module 309 and the test metadata module 311 (shown in FIG. 3C).

For various embodiments, one or more modules within the test generation module 305 may be used to implement operations 810, 820, 830, 840 and 850. For example, the user tracking module 306 may be used to implement the operation 810 or operation 820. In another example, the user analysis module 307 may be used to implement operation 830. In a further example, the operation 840 may be implemented with the modeling module 308.

Figure 8B:
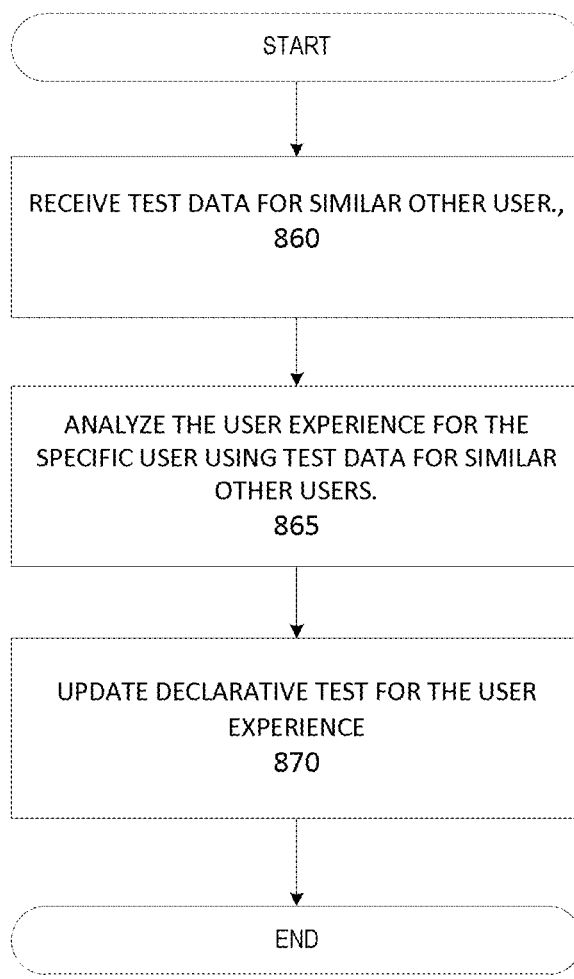
FIG. 8B is a flow diagram illustrating a method of updating declarative tests according to an example embodiment.

FIG. 8B illustrates an example flow diagram of a method of updating declarative tests with test data, according to an example embodiment. A method 851 for updating declarative tests is described by operations 860, 865, and 870 according to the various example embodiments. The method 851 may be implemented using one or more modules of the declarative testing tool 140, the GEI 300, the validator module 380, or the test generation module 305.

At operation 860 test data for similar other users is received. In an example embodiment, the test data is accessed from within the declarative testing tool 140, or from some system external to the declarative testing tool 140 such as the user behavior tracking system 143, which may access data stored in the data warehouse 142 or database(s) 126. At operation 865, the user experience for the specific user using is analyzed using test data for similar other users. Similar other users may represent users having the same or similar user type, actions and page transitions or other criteria. Sample data for these similar other users may be referred to as test data that is used by the declarative testing tool 140 to analyze the user experience being declaratively tested. The operation 865 may be used to analyze the user experience being tested with additional data (e.g., the test or sample data) that is fetched or accessed by the declarative testing tool 140. At operation 870, the declarative test for the user experience is updated. The updated test may be based on multiple users having similar user experiences. For various embodiments, the user experiences being updated in accordance with the method 851 may have been manually created by a user or automatically created, for example by the declarative testing tool 140.

Figure 8C:
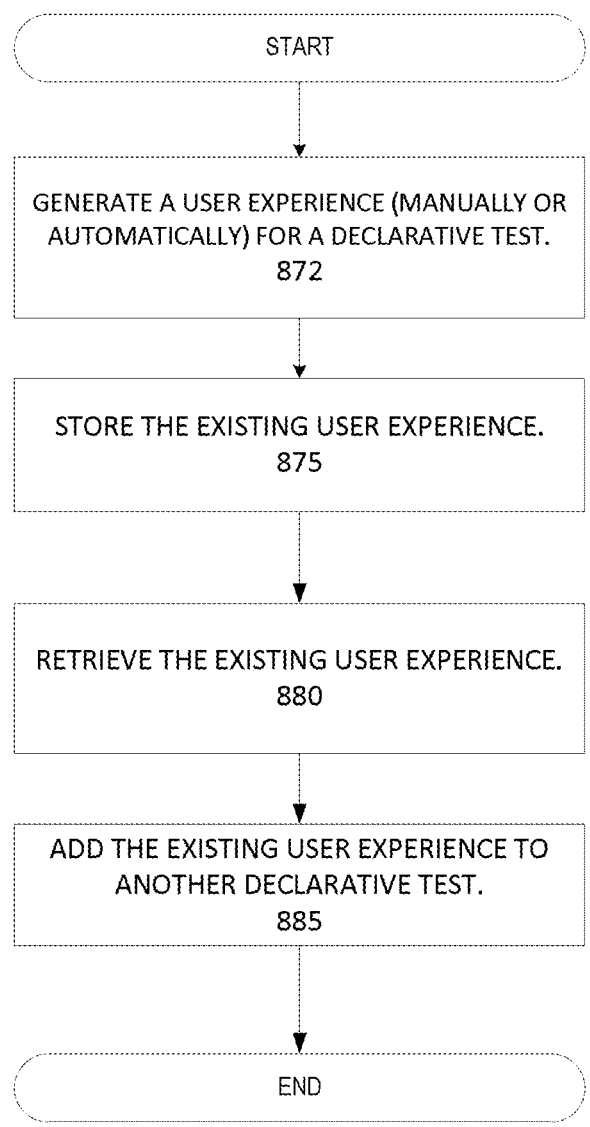
FIG. 8C is a flow diagram illustrating a method of using an existing user experience for a declarative test, according to an example embodiment.

FIG. 8C illustrates a flow diagram of a method of adding existing user experiences from declarative tests to another declarative test. A method. 871 for adding or using existing user experiences is described by operations 872, 875, 880, and 885 according to various embodiments. The method 871 may be implemented using one or more modules of the declarative testing tool 140, the GEI 300, the validator module 380, or the test generation module 305.

At operation 872, a user experience for a declarative test is generated either manually or automatically. The user experience generated at operation 872 is stored for possible reuse by another user experience or another declarative test. This generated user experience may be referred to as an existing user experience. At operation 880, the existing generated and stored user experience is retrieved. At operation 885, the existing retrieved, user experience may be added to another declarative test being created. In some embodiments, the existing user experience may be added to another user experience. In other embodiments, the existing user experience may be used as test data or sample data for testing other user experiences.

Figure 8D:
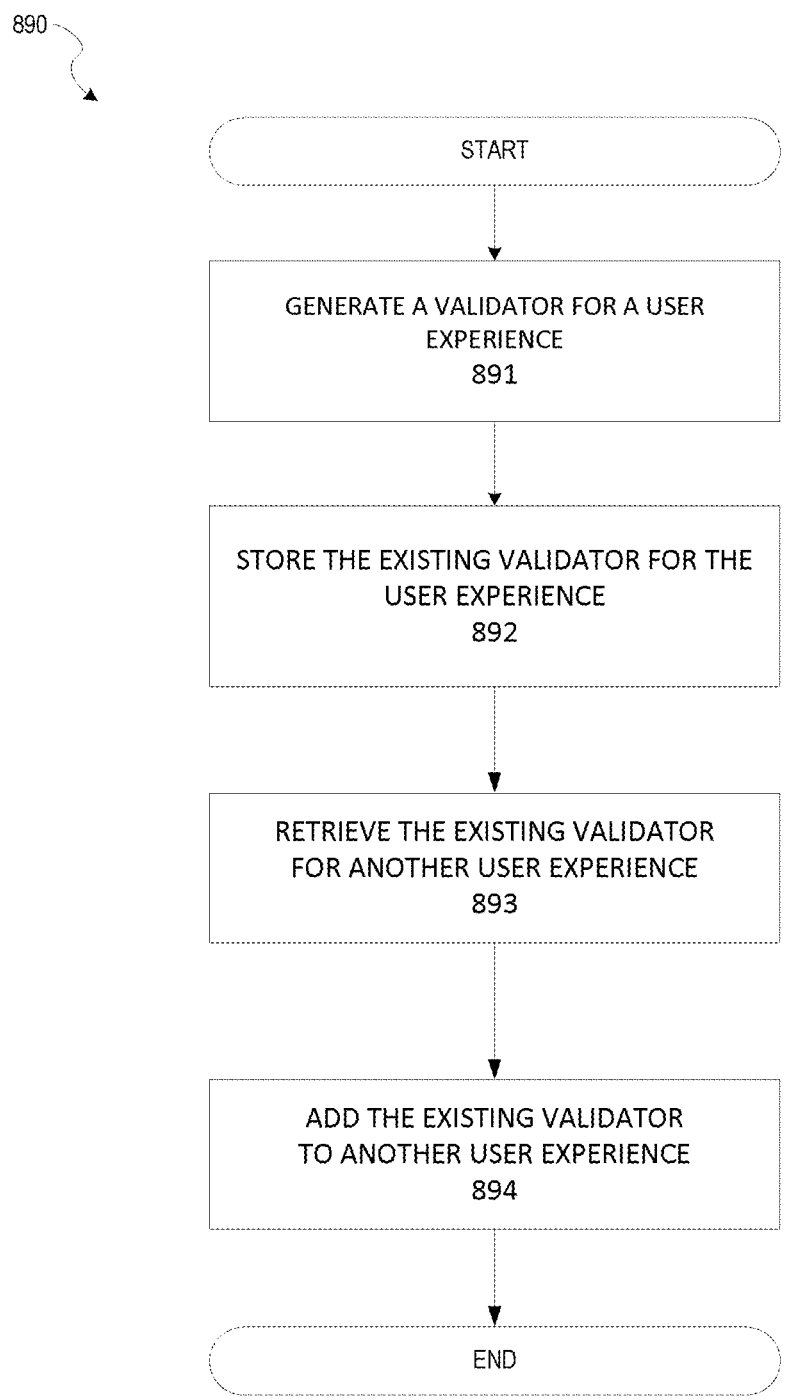
FIG. 8D is a flow diagram illustrating a method of using an existing validator, according to an example embodiment.

FIG. 8D illustrates a flow diagram of a method of adding existing validators to other user experiences or declarative tests. A method 890 for adding or using existing validators is described by operations 891-894. The method 890 may be implemented using one or more modules of the declarative testing tool 140, the GEI 300, the validator module 380, or the test generation module 305.

At operation 891, a validator for a user experience may be generated. For various embodiments, more than one validator may be generated for the user experience. Examples of the types of validators that may be generated include client UI validators, client data validators, system error and exception validators, system data validators, or other validators. These validators may be generated using the validator module 380 (shown in FIG. 3B), alone or in combination with one or more modules included within the test generation module 305, for example the self generating validator module 309 and the test metadata module 311 (shown in FIG. 3C). The validator generated or created at operation 891 may be referred to as an existing validator. At operation 892, the existing validator for the user experience being tested is stored. The validator may be stored within the declarative testing tool 140, or external to the declarative testing tool 140, for example within the database(s) 126. At operation 893, the existing validator is retrieved so that it may be used in another user experience being tested or created. At operation 894, the existing validators are added to another user experience or declarative test. The method 890 allows validators already generated by the system (e.g., the declarative testing tool 140) to be reused or used in other declarative tests. As more and more user experiences are being tested and validated, the number of user experiences collected increases. The declarative testing tool 140 may utilize this collection of user experiences generated and stored, to create new user experiences for testing. The declarative testing tool 140 may be considered a self-learning system that is capable of auto-generating declarative tests associated with user experiences. These auto-generated tests may include auto-generated validators. In some embodiment, the user experience may be either manually or auto-generated. In other embodiment, the validators may be either manually or auto-generated. FIGS. 9A-9O illustrates various user interfaces that may be used to manually create user experiences having multiple pages, including the creation of associated flows, actions and validators.

Example GEI-Runner (GEI Framework)

Below is an example of how a GEI-runner within the GEI 260 (shown in FIG. 2) may be used:

```
1.   Please add below maven dependency to your POM.
2.   <dependency>
3.       <groupId>com.ebay.e2esolutions.gei</groupId>
4.       <artifactId>gei-runner</artifactId>
5.       <version>0.0.1-SNAPSHOT</version>
6.       <scope>compile</scope>
     </dependency>
7.   Add the below repository in your POM under repositories section.
8.   <repository>
9.       <id>ebay.platform.qe.snapshots</id>
10.
         <url>http://nxrepository/nexus/content/repositories/ebay.platform.qe.staging</url>
11.      <snapshots>
12.          <enabled>true</enabled>
13.      </snapshots>
14.      <releases>
15.          <enabled>false</enabled>
16.      </releases>
17.  </repository>
18.  <repository>
19.      <id>ebay.platform.qe.releases</id>
20.
         <url>http://nxrepository/nexus/content/repositories/ebay.platform.qe.releases</url>
21.      <snapshots>
22.          <enabled>false</enabled>
23.      </snapshots>
24.      <releases>
25.          <enabled>true</enabled>
26.      </releases>
     </repository>
27.  Create your own test class by extending ExperienceTest class. Provide a test
     method and execute experience by using runner object. Find the below
     snippet of code.
28.  public class SampleTest extends ExperienceTest {
29.      @Test
30.      public void testSample1( ) {
31.          runner.run("MyEbayMessages", "qa", "staging", "US",
     BrowserType.FireFox);
32.      }
     }
```

An example of a JSON specification for building a user experience is described below. The JSON specification includes a JSON definition for the user experience, a JSON definition for a flow, and a JSON definition for a step or action.

Example Experience JSON Specifications

An example JSON structure to build a user experience is defined below. The example JSON structure includes user experience information and a set of flows. Each flow contains one or more steps (also referred to as actions). A step may be an action (like a click, typing, mouse over etc.) or an assert (assert element presence, attribute presence or text contains, etc.).

1. Experience JSON Definition:

Experience consists of below mandatory JSON properties.

```
{
    "expId" : "MyEbayMessages",
    "name" : "My Ebay Message Experience",
    "desc" : "My Ebay Message Experience. Once you land on the my
eBay summary screen click on Messages tab.",
    "domainType" : "EBay",
    "owner" : "knagamalla",
    "environment" : "prod",
    "environmentName" : "prod",
    "site" : "US",
    "browserType" : "FireFox"
}
```

A summary of the properties for the example JSON data structure is described in the table below,

| Property Name | Required data? |
|---|---|
| expId | YES |
| name | YES |
| description | YES |
| domainType | YES |
| owner | YES |
| environment | YES |
| environmentName | YES |
| site | YES |
| browserType | YES |
| javascriptEnabled | NO |
| sampleRate | NO |

2. Flow JSON Definition:

An example flow contains flow information and set of steps as described below.

```
{
    "flowId" : "HomePage",
    "name" : "Home Page",
    "desc" : "Home Page Flow",
    "owners" : "knagamalla",
    "flowInstanceId" : "HomePage1",
    "browserType" : "FireFox",
    "pageUrl" : "http://www.ebay.com/",
    "steps" : [ ],
}
```

A summary of the properties for flow JSON definition is described in the table below.

| Property Name | Required data? |
|---|---|
| flowId | YES |
| name | YES |
| desc | YES |
| owners | YES |
| flowInstanceId | YES |
| browserType | NO |
| pageUrl | YES |
| browserRetry | NO |
| retryCount | NO |
| refId | NO |

3. Step JSON Definition:

An example step represents an action, data generation, or assertions to be performed on page/screen. In various embodiments, a wide variety of actions can be performed on a page, such as click, type, mouse over, and the like. Other embodiments may provide support for more advanced actions. A description of actions is provided in the table below.

| Action | Description |
|---|---|
| Typing | Enter text in text field/text area/password field. |
| Click | Clicking button/link/check box/radio button or any mouse click actions. |
| Mouse Over | Inventor to complete |
| Mouse Out | Inventor to complete |
| Javascript Execution | Inventor to complete |

In example embodiments, one way of generating data needed to complete a user experience is to consume data from data queues. In various embodiments, many types of assertions may be performed on a page, such as element'attribute presence, or text contains, and the like. The table below provides examples of assertions.

| Assertion | Supported |
|---|---|
| Element Presence | YES |
| Attribute Presence | YES |
| Attribute Value Equals | YES |
| Attribute Value Contains | YES |
| Element Text Equals | YES |
| Element Text Contains | YES |

Example One Page User Experience (Read-Only)

An example flow of creating a read-only, one page user experience is described below. In one embodiment, a one page user experience may be added by using the steps described below:

1. Enter valid Experience Id. Max 40 alpha numeric characters only.
2. Enter valid Experience Name and Description.
3. Enter any file name you want to create for this experience. Include a JSON file extension or your experience will never execute. You can give the same file name for more than one experience.
4. Choose any one experience category.
5. Select Environment.
6. Select Site.
7. Enter valid Flow Id. Max 40 alpha numeric characters only.
8. Enter valid Flow Name.
9. Enter valid page HTTP URL to create as an experience.
10. Enter one or more CORP, DL to be notified when this experience fails.
11. Select browser type. Default value is HtmlUnit is headless mode simulate the browser without launching real browser like IE, FireFox. If your experience creation fails with this option, try selecting another browser type, like FireFox,
12. Java Script enabled option only valid for HtmlUnit. Default to unchecked if experience creation fails, then try enabling Java Script and adding experience.
13. Add one or more assertions separated by commas. Each assert described in { }brackets key value pairs as JSON format. Find the below valid keys and values allowed while defining asserts.
    1. Below are 6 types of assert types. You can apply one or more (all) with any number occurrences.
        1. "type":"ELEMENT_PRESENCE": Assert specific element presence. Element will be identified by specified by the xpath.
        2. "type":"ATTRIBUTE_PRESENCE": Assert attribute presence. Element will be identified by specified by the xpath.

3. "type":"ATTRIBUTE_VALUES_CONTAINS": Assert attribute value contains specific keyword. Element will be identified by specified by the xpath.
4. "type":"ATTRIBUTE_VALUE_EQUALS": Assert attribute value should be equal to specific keyword. Element will be identified by specified by the xpath,
5. "type":"TEXT_CONTAINS": Assert element text contains specific keyword. Element will be identified by specified by the xpath.
6. "type":"TEXT_EQUALS": Assert element text should be equal to specific keyword. Element will be identified by specified by the xpath.
2. Every assert should have the following properties:
   1. xpath: identifies an element on the page.
   2. type: Identifies type of assert statement. It should be one of the above types.
3. Optional assert properties.
   1. validationType: Information to identify this is page level validation or Functional validation. Valid values PAGE and FUNCTIONAL. If you don't specify this property the default is FUNCTIONAL.
   2. value: This property valid only when assert type is one of this TEXT_CONTAINS, TEXT_EQUALS, ATTRIBUTE_VALUE_CONTAINS, ATTRIBUTE_VALUE_EQUALS
   3. desc: This property to describe the assert information in readable text.
   4. attributeName: This property valid only when assert type is on of this ATTRIBUTE_PRESENCE, ATTRIBUTE_VALUE_CONTAINS, ATTRIBUTE_VALUE_EQUALS Example Multi Page Experience An example flow to create a multiple page experience is described below. The example flow includes (1) defining an experience and (2) defining a new flow.
1. Defining an Experience: Experience is composed of multiple flows. A flow may have one or more steps. Below is a JSON snippet that may be added to a flow in the user experience. In an example embodiment, only the first flow in the user experience should have pageUrl property. Existing flows may be reused. In the example below, the HomePage, SingInPage, MyEbaySummaryPage Flow and defining PurchaseHistoryPage Flow are reused.

```
{
"flows":[
   {
      "refId":"HomePage",
      "flowInstanceId":"HomePage1",
      "pageUrl":"http://www.ebay.com"
   },
   {
      "refId":"SingInPage",
      "flowInstanceId":"SingInPage1"
   },
   {
      "refId":"MyEbaySummaryPage",
      "flowInstanceId":"MyEbaySummaryPage1"
   },
   {
      "flowId":"PurchaseHistoryPage",
      "flowInstanceId":"PurchaseHistoryPage1",
      "name":"Purchase History Page",
      "desc":"My Ebay Purchase History Page",
      "steps":[
```

-continued

```
         {
            "xpath":".//*[@id='myRCP313h']//*[contains(@class, 'g-m0')]",
            "type":"TEXT_CONTAINS",
            "value":"Purchases",
            "desc":"Asserting Purchases text heading"
         }
      ]
   }
]
}
```

2. Defining a new Flow: A flow may contain one or more steps as shown below.

1. Typing a value into a textbox element : To get value as input parameter must be wrap as __P{parameterName}
2. {
3.     xpath : ".//*[@id='userid']"
4.     action : "type"
5.     text : "__P{userid}"
6.     desc : "Typing user id in username text field"
   }
7. Click Action :
8. {
9.     xpath : ".//*[@id='sgnBt']"
10.    action : "click"
11.    desc : "Clicking on sing-in button"
   }
12. Assertion : Adding an assertion step to validate element presence/attribute presence or value of an element or attribute.
13. {
14.    "xpath" : ".//*[contains(@class, 'myw-mt')]//*[contains(@class, 'g-m')]",
15.    "type" : "TEXT_CONTAINS",
16.    "value" : "All messages",
17.    "desc" : "Asserting All messages text heading"

Example Step and Screen Shot

Several example screen shots of user interfaces are shown below. In various embodiments, these example screen shots of user interfaces may be used to create a multiple page user experience declarative test. In some embodiments, these experiences may be created manually by a user, such as test user. For one embodiment, the screen shots represent the user interface of the automated test software user interface 250, shown in FIG. 2. In some embodiments, the user interface module 320, alone or in combination with the user experience module 360, the flow module 370 or the validator module 380 may provide functionality to create a multiple page user experience. The series of screen shots below illustrates the creation of a multiple page user experience.

FIG. 9A illustrates a user interface 901 displaying an icon 902 for creating a multiple page experience. The icon 902, shown at the top right corner, is selected when a user would like to create a multipage experience. After selecting the icon 902, a user interface 903 is displayed for creating a new experience, as shown in FIG. 9B. The user may enter experience configuration information in the experience configuration fields 904-908. When the user is ready to move to the next screen, the user selects a next button 909. FIG. 9C illustrates a user interface 910 for choosing or adding flows. To create a new flow, the user selects create new flow button 911.

Figure 9D:
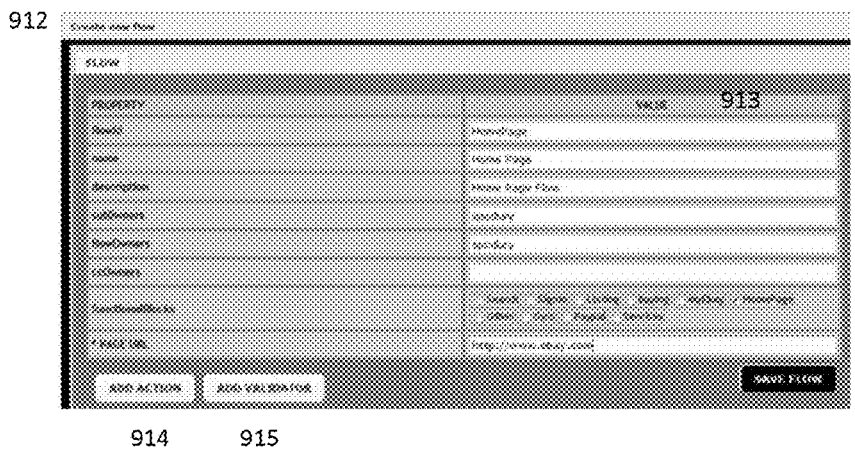

FIG. 9D illustrates a user interface 912 for creating a new flow. The user may enter one or more flow property values in the fields under the value field 913. Additionally, the user may add an action by selecting an add action button 914 or add a validator by selecting an add validator button 915.

Figure 9E:
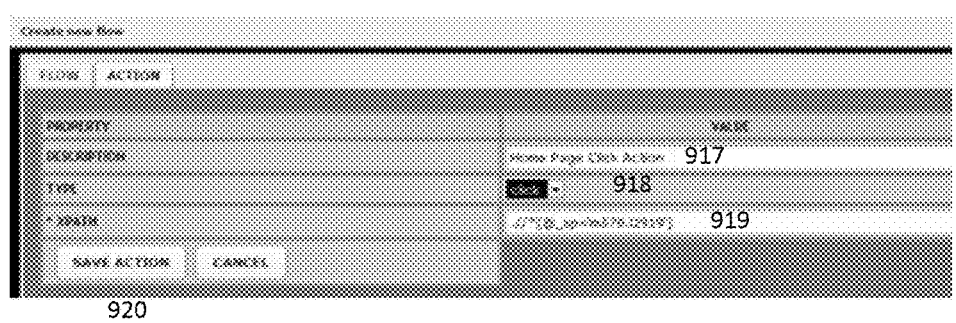
Figure 9F:
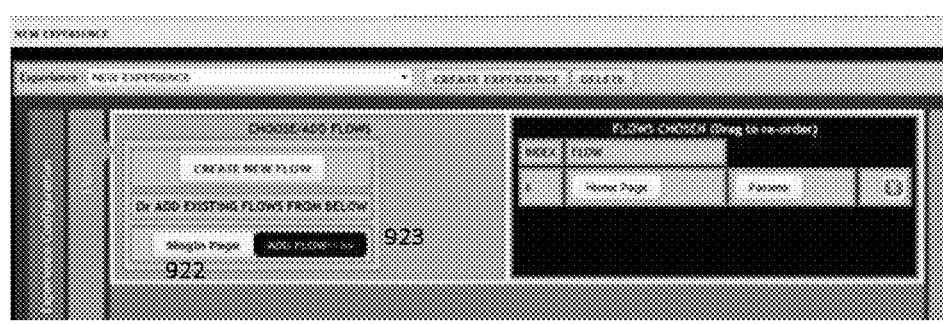
Figure 9G:
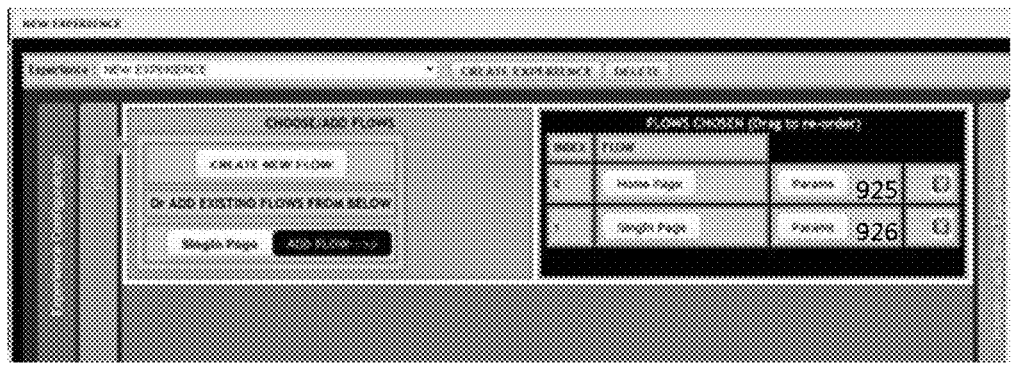
Figure 9H:

After a user enters the add action button 914, a user interface 916 is displayed as shown in FIG. 9E. Various values may be entered by the user into the value fields 917-919. Once the values are entered, the user clicks on a save action button 920, which will navigate the user to the flow screen 921 shown in FIG. 9F. In the flow screen 921, the user specifies adding a new experience (by clicking an add flow button 923) to an existing flow called "SignIn Page" shown at field 922. In FIG. 9G, the user adds parameters for the experience by clicking on one or more of the params buttons 925 and 926. As shown in FIG. 9H, the user enters additional parameter information as shown in screen 927. For example, the user may select the add button 928 and then the save button 929 to add parameters. In an example embodiment, the following information is added by a user:

Enter the 1$^{st}$ parameter for userid
"name":"userid",
"prodValue":"e2e-livesite-seller-core",
"sandboxValue":"TESTUSER_e2e",
"qaValue":"e2eexperience",
"defaultValue":"e2eexperience",
"type":"STRING",
"sequenceNumber":"1"
Enter the 2$^{nd}$ parameter for password
"name":"pass",
"prodValue":"53cma12mm0nb",
"sandboxValue":"P@ssword",
"qaValue":"password",
"defaultValue":"password",
"type":"PASSWORD",
"sequenceNumber":"2"

Figure 9I:
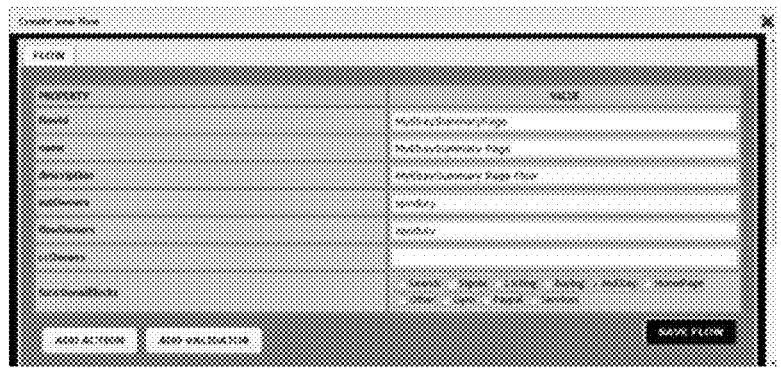
Figure 9J:
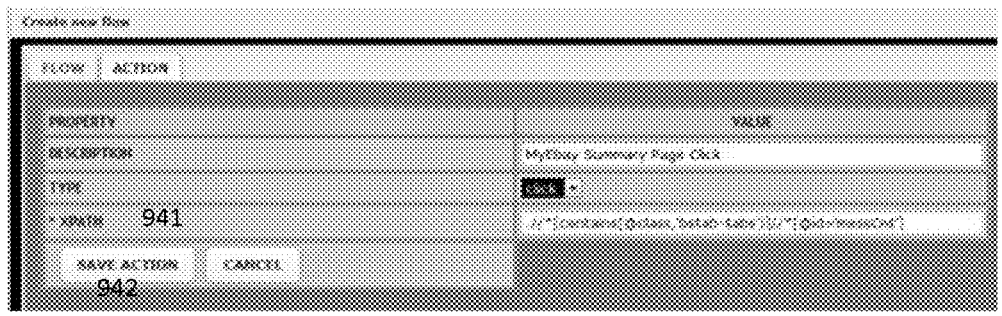
Figure 9K:
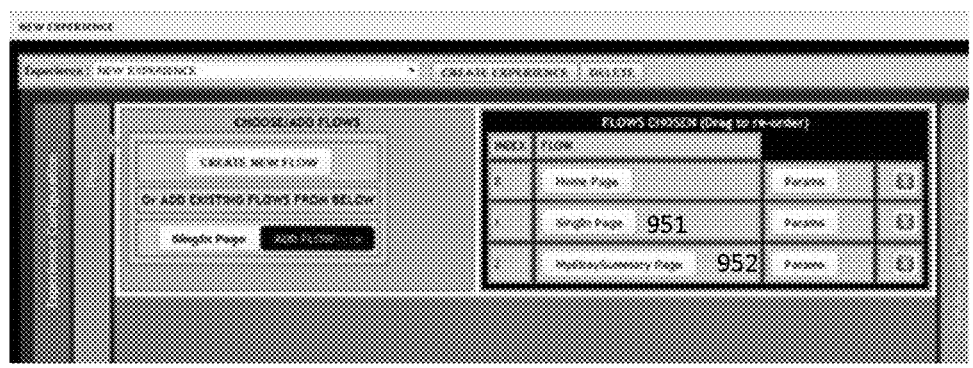
Figure 9L:
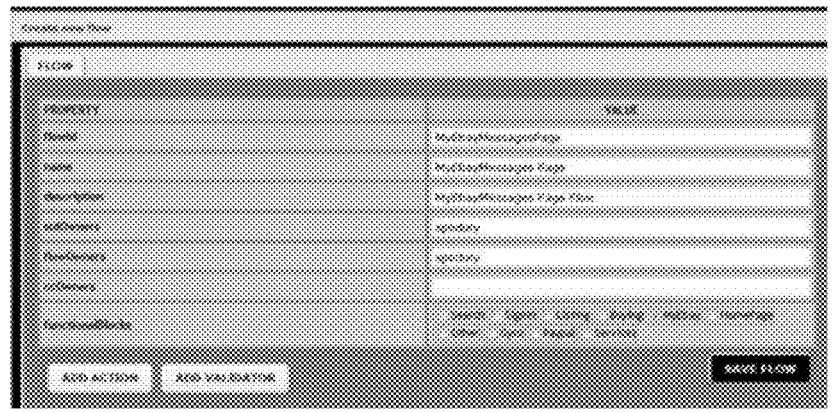

FIG. 9I illustrates a display screen 930 for creating a new flow for MyEbay Summary Page. Appropriate values are entered into the property fields. FIG. 9J illustrates a display screen 940 for creating an action for MyEbaySummaryPage. In an example, the user enters the following information into the xPath field 941: Xpath: .//*[contains(@class,'bstab-tabs')]//*[@id='messCnt'. Once the fields in the display screen 940 are entered, the user may select a save action button 942. Next, a user may save the flow currently being worked on (e.g., MyEbaySummaryPage) and return back to the flow page shown in FIG. 9K. A user interface 950 is displayed illustrating a flow page where a user is adding to an existing flow for SignIn Page selected from SignInPage 951. After values are entered for the SignIn Page flow, the user then saves the flow and adds to an existing flow, MyEbayMessagesPage, selected from MyEbayMessagePage 952 by adding values. The user interface 953 shown in FIG. 9L illustrates the values added to MyEayMessagePage 952.

Figure 9M:
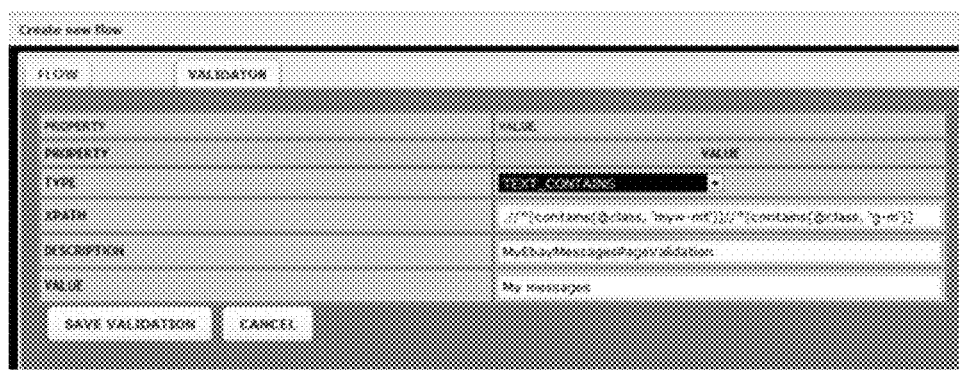
Figure 9N:
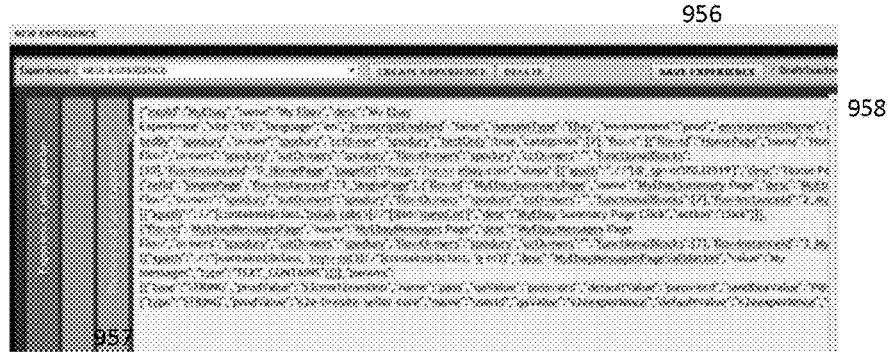
Figure 9O:
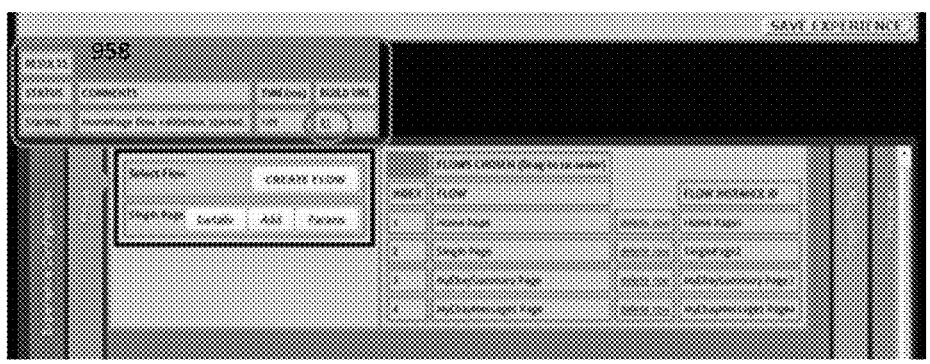

FIG. 9M illustrates a user interface display 954 for adding validators. When adding a validator, one or more values are added in display 954. Once the values are entered, the user may then select a save validation button to save the validation added, and then may save the flow, and return back to a flow page. When all desired flows have been added to a user experience, the user experience is saved by clicking on the save experience button 956 shown in the display 955 in FIG. 9N. The display 955 also displays a preview and save experience button 957. For an example embodiment, the preview and save experience button 957 is selected and the results are shown in display area 958. As shown in FIG. 9O, a display 959 shows updated results in display area 958 during the preview or as progress happens at the backend.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuitry (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuitry and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "Cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Applications

FIG. 10 illustrates an example mobile device 1000 that may be executing a mobile operating system (e.g., iOS™, Android™, Windows® Phone, or other mobile operating systems), according to example embodiments. In one embodiment, the mobile device 1000 may include a touch screen that may receive tactile information from a user 1002. For instance, the user 1002 may physically touch 1004 the mobile device 1000, and in response to the touch 1004, the mobile device 1000 may determine tactile information such as touch location, touch force, gesture motion, and so forth. In various example embodiment, the mobile device 1000 may display home screen 1006 (e.g., Springboard on iOS™) that the user 1002 of the mobile device 1000 may use to launch applications and otherwise manage the mobile device 1000. In various example embodiments, the home screen 1006 may provide status information such as battery life, connectivity, or other hardware status. The home screen 1006 may also include a plurality of icons that may be activated to launch applications, for example, by touching the area occupied by the icon. Similarly, other user interface elements may be activated by touching an area occupied by a particular user interface element. In this manner, the user 1002 may interact with the applications.

Many varieties of applications (also referred to as "apps") may be executing on the mobile device 1000. The applications may include native applications (e.g., applications programmed in Objective-C running on iOS™ or applications programmed in Java running on Android™), mobile web applications (e.g., HTML5), or hybrid applications (e.g., a native shell application that launches an HTML5 session). In a specific example, the mobile device 1000 may include a messaging app 1020, audio recording app 1022, a camera app 1024, a book reader app 1026, a media app 1028, a fitness app 1030, a file management app 1032, a location app 1034, a browser app 1036, a settings app 1038, a contacts app 1040, a telephone call app 1042, other apps (e.g., gaming apps, social networking apps, biometric monitoring apps), a third party app 1044, and so forth.

Software Architecture

Figure 11:
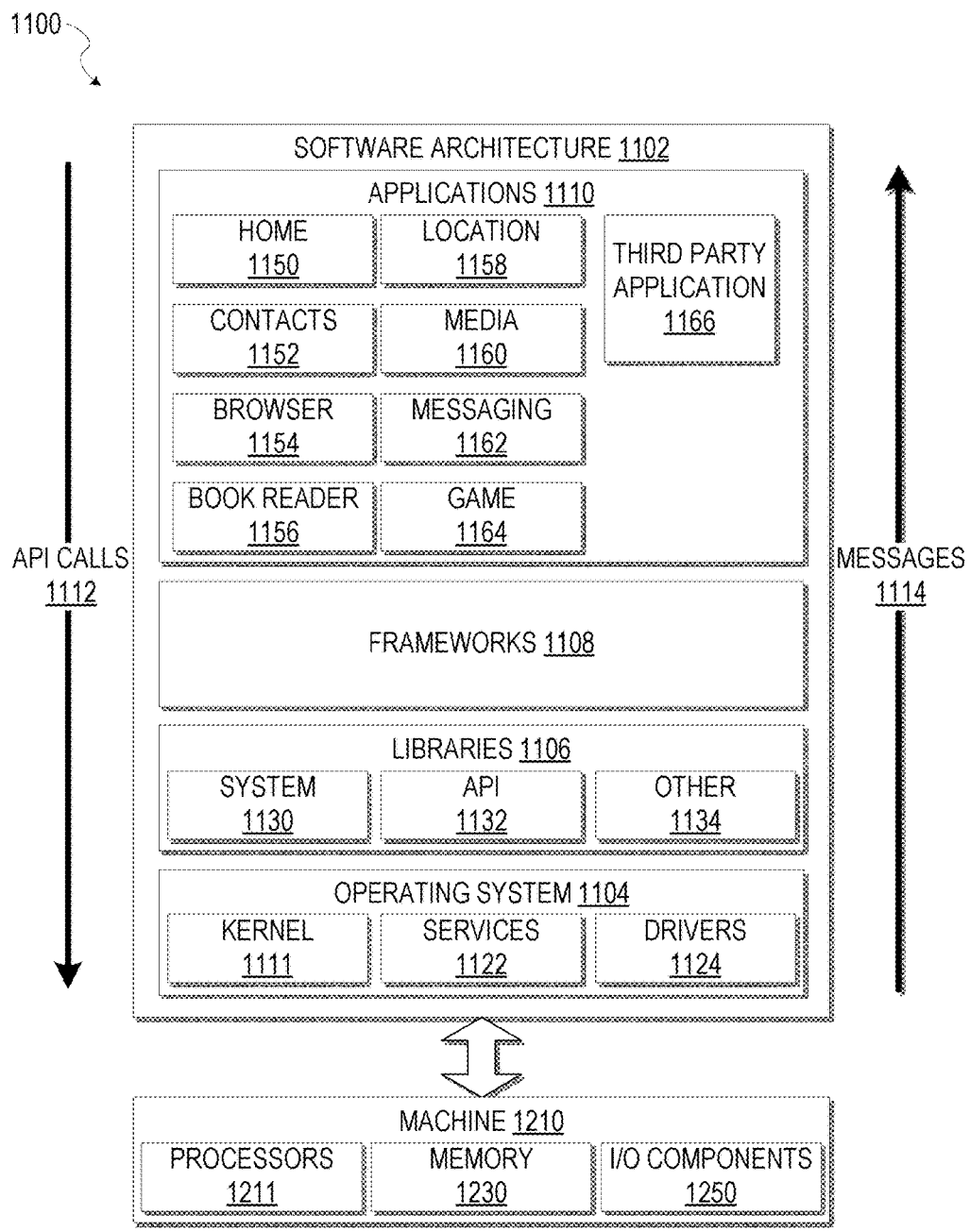
FIG. 11 is a block diagram illustrating a mobile device, according to an example embodiment.

FIG. 11 is a block diagram 1100 illustrating an architecture of software 1102, which may be installed on any one or more of devices described above. FIG. 11 is merely a non-limiting example of a software architecture and it will be appreciated that many other architectures may be implemented to facilitate the functionality described herein. The software 1102 may be executing on hardware such as machine 1200 of FIG. 12 that includes processors 1210, memory 1230, and I/O components 1250. In the example architecture of FIG. 11, the software 1102 may be conceptualized as a stack of layers where each layer may provide particular functionality. For example, the software 1102 may include layers such as an operating system 1104, libraries 1106, frameworks 1108, and applications 1110. Operationally, the applications 1110 may invoke application programming interface (API) calls 1112 through the software stack and receive messages 1114 in response to the API calls 1112.

The operating system 1104 may manage hardware resources and provide common services. The operating system 1104 may include, for example, a kernel 1111, services 1122, and drivers 1124. The kernel 1111 may act as an abstraction layer between the hardware and the other software layers. For example, the kernel 1111 may be responsible for memory management, processor management (e.g., scheduling), component management, networking, security settings, and so on. The services 1122 may provide other common services for the other software layers. The drivers 1124 may be responsible for controlling or interfacing with the underlying hardware. For instance, the drivers 1124 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 1106 may provide a low-level common infrastructure that may be utilized by the applications 1110. The libraries 1106 may include system 1130 libraries (e.g., C standard library) that may provide functions such as memory allocation functions, string manipulation functions, mathematic functions, and the like. In addition, the libraries 1106 may include API libraries 1132 such as media libraries (e.g., libraries to support presentation and manipulation of various media format such as MPREG4, 11.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1106 may also include a wide variety of other libraries 1134 to provide many other APIs to the applications 1110.

The frameworks 1108 may provide a high-level common infrastructure that may be utilized by the applications 1110. For example, the frameworks 1108 may provide various graphic user interface (DATA) functions, high-level resource management, high-level location services, and so forth. The frameworks 1108 may provide a broad spectrum of other APIs that may be utilized by the applications 1110, some of which may be specific to a particular operating system or platform.

The applications 1110 include a home application 1150, a contacts application 1152, a browser application 1154, a book reader application 1156, a location application 1158, a media application 1160, a messaging application 1162, a game application 1164, and a broad assortment of other applications such as third party application 1166. In a specific example, the third party application 1166 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1166 may invoke the API calls 1112 provided by the mobile operating system 1104 to facilitate functionality described herein.

Example Machine Architecture and Machine-Readable Medium

Figure 12:
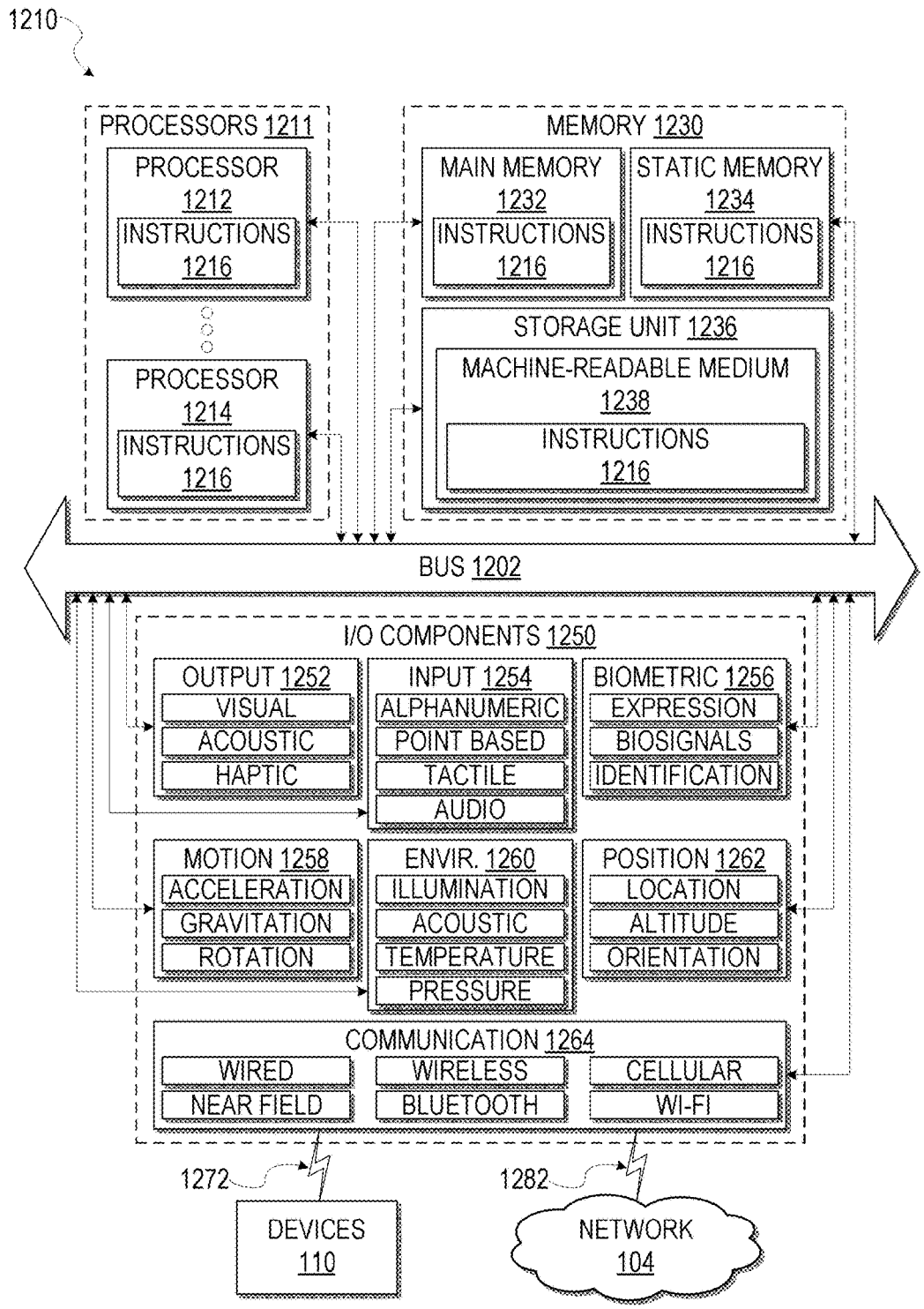
FIG. 12 is a block diagram illustrating components of a machine, according to some example embodiments.

FIG. 12 is a block diagram illustrating components of a machine 1210, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1211 memory 1230, and I/O components 1250, which may be configured to communicate with each other via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1212 and processor 1214 that may execute instructions 1216. The term "processor" is intended to include multi-core processor that may comprise two or more independent processors (also referred to as "cores") that may execute instructions contemporaneously. Although FIG. 12 shows multiple processors 1210, the machine 1200 may include a single processor with a single core, a single processor with multiple cores (e.g., a multi-core process), multiple processors with a single core, multiple processors with multiples cores, or any combination thereof.

The memory 1230 may include a main memory 1232, a static memory 1234, and a storage unit 1236 accessible to the processors 1210 via the bus 1202. The storage unit 1236 may include a machine-readable medium 1238 on which is stored the instructions 1216 embodying any one or more of the methodologies or functions described herein. The instructions 1216 may also reside, completely or at least partially, within the main memory 1232, within the static memory 1234, within at least one of the processors 1210 (e.g., within the processor's cache memory), or any suitable combination thereof, during execution thereof by the machine 1200. Accordingly, the main memory 1232, static memory 1234, and the processors 1210 may be considered as machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown in an example embodiment to be a single medium, the term "machine-readable medium" should be taken to include a single medium or multiple media (e.g., a centralized or distributed database, or associated caches and servers) able to store instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1250 may include a wide variety of components to receive input, provide output, produce output, transmit information, exchange information, capture measurements, and so on. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components (e.g., a microphone), and the like.

In further example embodiments, the I/O components 1250 may include biometric components 1256, motion components 1258, environmental components 1260, or position components 1262 among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 104 or devices 110 via coupling 1282 and coupling 1272, respectively. For example, the communication components 1264 may include a network interface component or other suitable device to interface with the network 104. In further examples, communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 110 may be another machine or any of a wide variety of peripheral devices (e.g., a peripheral device coupled via a Universal Serial Bus (USB)).

Moreover, the communication components 1264 may detect identifiers or include components operable to detect identifiers. For example, the communication components 1264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 104 or a portion of the network 104 may include a wireless or cellular network and the coupling 1282 may be a Code Division Multiple Access (CDMA) connection, a Global System for Mobile communications (GSM) connection, or other type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1216 may be transmitted or received over the network 104 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to devices 110. The term "transmission medium" shall be taken to include any intangible medium that is capable of storing, encoding, or carrying instructions 1216 for execution by the machine 1200, and includes digital or analog communications signals or other intangible medium to facilitate communication of such software.

Furthermore, the machine-readable medium 1238 is non-transitory (in other words, not having any transitory signals) in that it does not embody a propagating signal. However, labeling the machine-readable medium 1238 as "non-transitory" should not be construed to mean that the medium is incapable of movement; the medium should be considered as being transportable from one physical location to another.

Additionally, since the machine-readable medium 1238 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   identifying a declarative test representing a user experience being tested;
   simulating a client machine including a client machine environment;
   retrieving user behavior data of a specific user related to the user experience being tested;
   executing the declarative test using the simulated client machine and the user behavior data of the specific user to generate test results, including executing the declarative test using the simulated client machine and user behavior data of a test user to generate additional test results;
   obtaining two or more validators, the two or more validators including at least one client-side validator and at least one server-side validator, a first validator of the two or more validators recalled from a previous declarative test, the first validator automatically generated in the previous declarative test based on a declared answer representing a correct operation associated with a previous user experience being tested in the previous declarative test, and a second validator of the two or more validators generated as a new validator; and
   validating the test results by invoking at least one of the two or more validators.

2. The method of claim 1, wherein simulating the client machine, including the client machine environment, further comprises:
   simulating one or more of operating systems, browser applications, native applications or other software applications running on the client machine during a user experience corresponding to the user experience being tested.

3. The method of claim 1, wherein the declarative test representing the user experience being tested is able to be executed in a plurality of different simulated client machine environments.

4. The method of claim 1, wherein retrieving the user behavior data further comprises:
   identifying the user behavior data by logging in with user credentials of the specific user; and
   accessing the user behavior data related to the user experience being tested.

5. The method of claim 1, wherein retrieving the user behavior data further comprises:
   retrieving the user behavior data of the specific user from a user behavior tracking system, the user behavior tracking system tracking user actions related to a site of a user experience being tested.

6. The method of claim 5, wherein retrieving the user behavior data of the specific user from the user behavior tracking system, further comprises:
   accessing, by the user behavior tracking system, the user behavior data of the specific user stored in a data warehouse.

7. The method of claim 1, wherein validating the test results by invoking the first validator further comprises:
   invoking the at least one client-side validator, the at least one client-side validator including a user interface (UI) validator to validate UI data presented.

8. The method of claim 1, wherein validating the test results by invoking the first validator, further comprising:
   invoking the at least one client-side validator, the at least one client-side validator including a system validator to validate client data.

9. The method of claim 1, wherein validating the test results by invoking the first validator further comprises:
   invoking the at least one server-side validator, the at least one server-side validator including a system error and exception validator to validate system errors and exceptions.

10. The method of claim 9, wherein invoking the at least one server-side validator further comprises:

providing input to the first validator invoked, the input including, at least: a request simulated by a test system, a response received from the user experience being tested, test metadata, and error and exception tracking data logged by a centralized logging system.

11. The method of claim 1, wherein validating the test results by invoking the first validator further comprises:
invoking the at least one server-side validator, the at least one server-side validator including a system data validator to validate system data.

12. The method of claim 11, wherein invoking the at least one server-side validator further comprises:
providing input to the first validator invoked, the input including, at least: a request simulated by a test system, a response received from the user experience being tested, test metadata, and additional data, the additional data including at least one or more of application data from the user experience being tested or user behavior data of a user.

13. The method of claim 1, wherein validating the test results by invoking the first validator further comprises:
invoking the two or more validators sequentially.

14. The method of claim 1, wherein validating the test results by invoking the first validator further comprises:
invoking the two or more validators concurrently.

15. The method of claim 1, wherein validating the test results by invoking the first validator further comprises:
providing input to the first validator invoked, the input including, at least: a request simulated by a test system, a response received from the user experience being tested, and test metadata.

16. A system comprising:
at least one processor;
at least one non-transitory machine readable medium storing instructions that, when executed by the at least one processor, are configured to cause the system to perform operations, the operations comprising:
identify a declarative test representing a user experience being tested;
simulate a client machine including a client machine environment;
retrieve user behavior data of a specific user related to the user experience being tested;
execute the declarative test using the simulated client machine and the user behavior data of the specific user to generate test results;
obtain two or more validators, the two or more validators including at least one client-side validator and at least one server-side validator, a first validator of the two or more validators recalled from a previous declarative test, the first validator automatically generated in the previous declarative test based on a declared answer representing a correct operation associated with a previous user experience being tested in the previous declarative test, and a second validator of the two or more validators generated as a new validator; and
validate the test results by invoking at least one of the two or more validators.

17. The system of claim 16, wherein the operations further comprise:
simulate one or more of operating systems, browser applications, native applications or other software applications running on the client machine during a user experience corresponding to the user experience being tested.

18. A non-transitory machine readable medium storing instructions that, in response to being executed by at least one processor of a system, cause the system to perform operations comprising:
identifying a declarative test representing a user experience being tested;
simulating a client machine including a client machine environment;
retrieving user behavior data of a specific user related to the user experience being tested;
executing the declarative test using the simulated client machine and the user behavior data of the specific user to generate test results;
obtaining two or more validators, the two or more validators including at least one client-side validator and at least one server-side validator, a first validator of the two or more validators recalled from a previous declarative test, the first validator automatically generated in the previous declarative test based on a declared answer representing a correct operation associated with a previous user experience being tested in the previous declarative test, and a second validator of the two or more validators generated as a new validator; and
validating the test results by invoking at least one of the two or more validators.

* * * * *